(12) United States Patent
Ookubo et al.

(10) Patent No.: US 12,581,214 B2
(45) Date of Patent: Mar. 17, 2026

(54) RANGE IMAGING DEVICE AND RANGE IMAGING METHOD

(71) Applicant: TOPPAN Inc., Tokyo (JP)

(72) Inventors: Yu Ookubo, Taito-ku (JP); Tomohiro Nakagome, Taito-ku (JP); Kunihiro Hatakeyama, Taito-ku (JP); Hiroshige Goto, Yokohama (JP); Satoshi Takahashi, Taito-ku (JP); Yasuyuki Hitsuoka, Taito-ku (JP)

(73) Assignee: TOPPAN Inc., Tokyo (JP)

( * ) Notice: Subject to any disclaimer, the term of this patent is extended or adjusted under 35 U.S.C. 154(b) by 165 days.

(21) Appl. No.: 18/460,743

(22) Filed: Sep. 5, 2023

(65) Prior Publication Data

US 2023/0412934 A1 Dec. 21, 2023

Related U.S. Application Data

(63) Continuation of application No. PCT/JP2022/006938, filed on Feb. 21, 2022.

(30) Foreign Application Priority Data

Mar. 5, 2021 (JP) ................................ 2021-035236
Jun. 9, 2021 (JP) ................................ 2021-096537

(51) Int. Cl.
*H04N 25/60* (2023.01)
*H04N 25/20* (2023.01)
(Continued)

(52) U.S. Cl.
CPC ............. *H04N 25/60* (2023.01); *H04N 25/20* (2023.01); *H04N 25/617* (2023.01);
(Continued)

(58) Field of Classification Search
CPC .... H04N 25/60; H04N 25/617; H04N 25/618; H04N 25/67; H04N 25/20
See application file for complete search history.

(56) References Cited

U.S. PATENT DOCUMENTS 6,683,676 B1 * 1/2004 Seo ........................ G01S 17/894
356/5.03
9,170,095 B1 * 10/2015 Tachibana ............. G01S 7/4865
(Continued)

FOREIGN PATENT DOCUMENTS

CN 106569221 B * 11/2019 ............. G01S 7/481
EP 0561353 A1 * 9/1993 ............. G01S 11/12
(Continued)

OTHER PUBLICATIONS

Extended European Search Report issued Jul. 16, 2024 in European Patent Application No. 22763023.3, 10 pages.
(Continued)

*Primary Examiner* — David N Werner
(74) *Attorney, Agent, or Firm* — Oblon, McClelland, Maier & Neustadt, L.L.P.

(57) ABSTRACT

A range imaging device includes a light source unit that emits light pulses to a measurement space; a light-receiving unit including a photoelectric conversion element that generates charge according to light incident from the space, a pixel circuit including charge storage units in which the charge is integrated in a frame cycle, and a pixel drive circuit that performs switching operation of transfer transistors to distribute the charge to the storage units for integration at integration timing synchronizing with emission of the pulses; and a distance calculation unit that calculates a distance between object in the space and the light-receiving unit based on charge determined by a first charge integrated in each storage unit. The calculation unit calculates the distance by subtracting a second charge from each first
(Continued)

charge, the second charge being noise charge as an integrated charge other than the charge distributed and integrated by the switching operation.

19 Claims, 17 Drawing Sheets

(51) Int. Cl.

| | |
|---|---|
| *H04N 25/617* | (2023.01) |
| *H04N 25/618* | (2023.01) |
| *H04N 25/62* | (2023.01) |
| *H04N 25/67* | (2023.01) |
| *H04N 25/705* | (2023.01) |
| *H04N 25/77* | (2023.01) |
| *G03B 13/20* | (2021.01) |
| *G06T 7/514* | (2017.01) |
| *G06T 7/521* | (2017.01) |
| *H04N 23/67* | (2023.01) |
| *H04N 25/61* | (2023.01) |
| *H04N 25/626* | (2023.01) |
| *H04N 25/63* | (2023.01) |
| *H04N 25/633* | (2023.01) |
| *H04N 25/65* | (2023.01) |

(52) U.S. Cl.
CPC ........... *H04N 25/618* (2023.01); *H04N 25/62* (2023.01); *H04N 25/67* (2023.01); *H04N 25/705* (2023.01); *H04N 25/77* (2023.01); *G03B 13/20* (2013.01); *G06T 7/514* (2017.01); *G06T 7/521* (2017.01); *H04N 23/671* (2023.01); *H04N 25/61* (2023.01); *H04N 25/626* (2023.01); *H04N 25/63* (2023.01); *H04N 25/633* (2023.01); *H04N 25/65* (2023.01)

(56) References Cited

U.S. PATENT DOCUMENTS

| | | | | |
|---|---|---|---|---|
| 2008/0079833 | A1* | 4/2008 | Ichikawa | G01S 7/4863 |
| | | | | 348/E3.027 |
| 2012/0212597 | A1* | 8/2012 | Hanna | G06F 3/013 |
| | | | | 348/78 |
| 2016/0011313 | A1* | 1/2016 | Rousseau | G01S 7/4816 |
| | | | | 356/5.01 |
| 2019/0041503 | A1* | 2/2019 | Shand | G01S 17/42 |
| 2019/0272560 | A1* | 9/2019 | Shin | G06N 3/08 |
| 2019/0331776 | A1* | 10/2019 | Aotake | G01S 7/497 |
| 2020/0028017 | A1 | 1/2020 | Imoto et al. | |
| 2021/0029313 | A1 | 1/2021 | Oh et al. | |
| 2021/0392280 | A1* | 12/2021 | Na | H04N 25/63 |
| 2021/0400217 | A1* | 12/2021 | Weiss | G01S 7/4915 |
| 2022/0078342 | A1* | 3/2022 | Whyte | H04N 25/60 |
| 2024/0045069 | A1* | 2/2024 | Danan | H04N 25/78 |
| 2024/0163415 | A1* | 5/2024 | Vu | H04N 13/194 |

FOREIGN PATENT DOCUMENTS

| | | | | |
|---|---|---|---|---|
| EP | 0561353 | B1 * | 11/1996 | G01S 11/12 |
| EP | 3598499 | A2 * | 1/2020 | G01S 17/894 |
| JP | 2015-029054 | A | 2/2015 | |
| JP | 2016-217907 | A | 12/2016 | |
| JP | 2020-013910 | A | 1/2020 | |
| JP | 2020139937 | A * | 9/2020 | |

OTHER PUBLICATIONS

International Search Report issued May 24, 2022 in PCT/JP2022/006938, filed Feb. 21, 2022, 5 pages.

* cited by examiner

LIGHT SOURCE
(ON: LIGHT EMISSION)

OFF

ON

TX1    CLOSED (L,OFF)

TX2    CLOSED

TX3    CLOSED

TX4    CLOSED

RSTD    OPEN (H,ON)

FIG.9

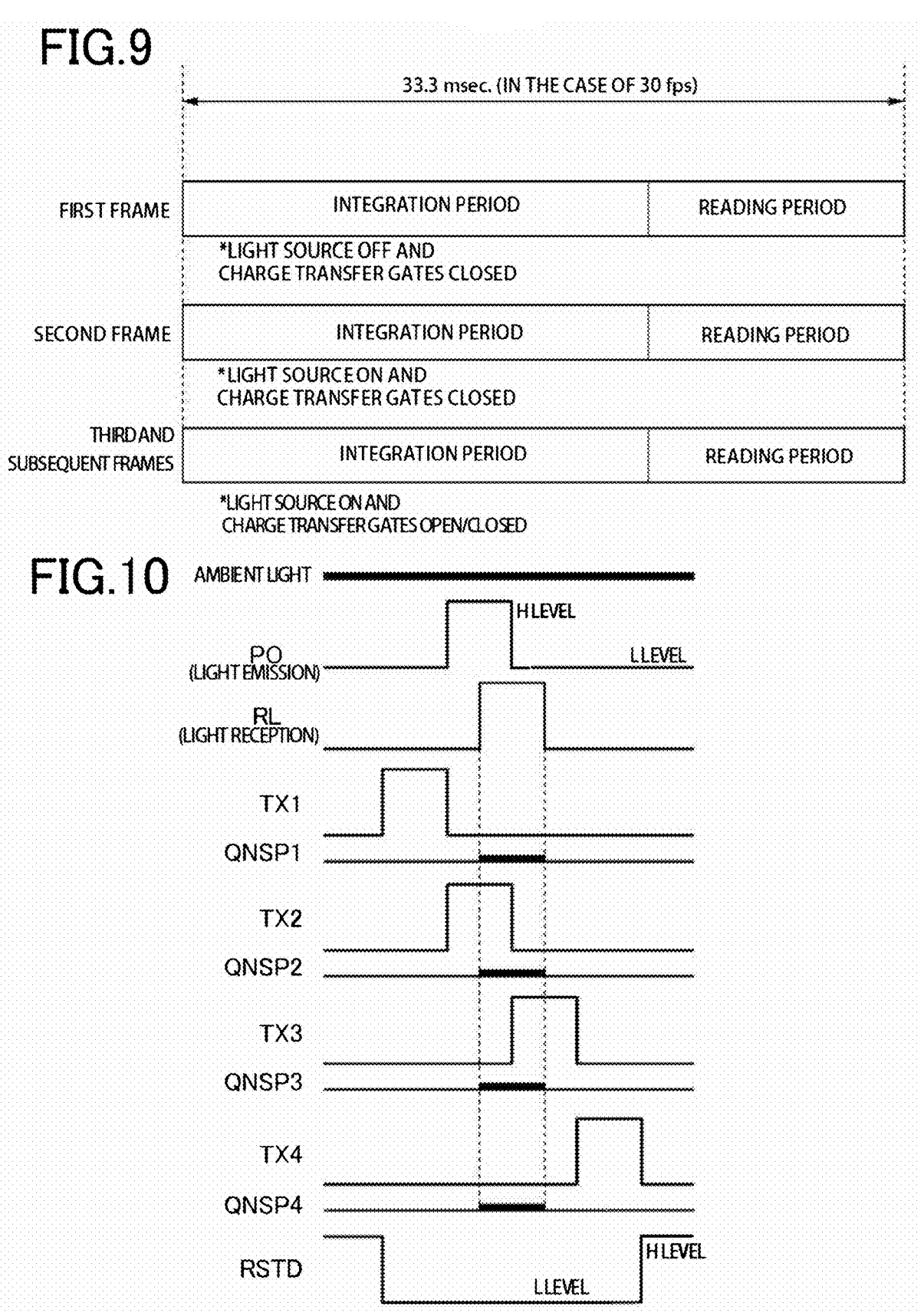

| FIRST FRAME | INTEGRATION PERIOD | READING PERIOD |
|---|---|---|

*LIGHT SOURCE OFF AND
CHARGE TRANSFER GATES CLOSED

| SECOND FRAME | INTEGRATION PERIOD | READING PERIOD |
|---|---|---|

*LIGHT SOURCE ON AND
CHARGE TRANSFER GATES CLOSED

| THIRD AND SUBSEQUENT FRAMES | INTEGRATION PERIOD | READING PERIOD |
|---|---|---|

*LIGHT SOURCE ON AND
CHARGE TRANSFER GATES OPEN/CLOSED 33.3 msec. (IN THE CASE OF 30 fps)

FIG.10

AMBIENT LIGHT

PO (LIGHT EMISSION)    H LEVEL    L LEVEL

RL (LIGHT RECEPTION)

TX1

QNSP1

TX2

QNSP2

TX3

QNSP3

TX4

QNSP4

RSTD    H LEVEL    L LEVEL

START

S101
ACQUIRE FIRST NOISE CHARGE QNSN

S102
ACQUIRE SECOND NOISE CHARGE QNSN

S103
ACQUIRE THIRD NOISE CHARGE QNSN

S104
ACQUIRE CHARGE Q

S105
CALCULATE ADJUSTMENT FACTOR k

S106
ACQUIRE ADJUSTED THIRD NOISE CHARGE kQNSP

S107
ACQUIRE FOURTH NOISE CHARGE QN

S108
CALCULATE CORRECTED CHARGE QC

S109
CALCULATE DELAY TIME Td

S110
CALCULATE DISTANCE

S111
END?

NO

YES

STOP

RANGE IMAGING DEVICE AND RANGE IMAGING METHOD

CROSS-REFERENCE TO RELATED APPLICATIONS

The present application is a continuation of and claims the benefit of priority to International Application No. PCT/JP2022/006938, filed Feb. 21, 2022, which is based upon and claims the benefit of priority to Japanese Application No. 2021-035236, filed Mar. 5, 2021 and Japanese Application No. 2021-096537, filed Jun. 9, 2021. The entire contents of these applications are incorporated herein by reference.

BACKGROUND OF THE INVENTION

Field of the Invention

The present invention relates to range imaging devices and range imaging methods.

Description of Background Art

JP-2015-29054 A describes time of flight (hereinafter referred to as TOF) type range imaging devices which measure the distance to an object based on the time of flight of light, using the speed of light. The entire contents of this publication are incorporated herein by reference.

SUMMARY OF THE INVENTION

According to one aspect of the present invention, a range imaging device includes a light source that emits light pulses to a measurement space, a light-receiving unit including a pixel drive circuit and at least one pixel circuit including a photoelectric conversion element and multiple charge storage units, and a distance calculation unit that calculates a distance between an object in the measurement space and the light-receiving unit based on a charge determined by a first charge of charge integrated in each of the charge storage units. The photoelectric conversion element of the light-receiving unit generates the charge according to light incident from the measurement space, the charge storage units of the light-receiving units integrate the charge in a frame cycle including one or more frames, the pixel drive circuit in the light-receiving unit performs switching operation of transfer transistors to distribute the charge to each of the charge storage units for integration therein at a predetermined integration timing synchronizing with emission of the light pulses, and the distance calculation unit calculates the distance by subtracting a second charge from each of the first charges such that the second charge is noise charge as an integrated charge other than the charge distributed and integrated by the switching operation of the transfer transistors.

According to another one aspect of the present invention, a range imaging method includes emitting light pulses into a measurement space by a light source of a range imaging device, integrating, in multiple charge storage units of at least one pixel circuit in the range imaging device in a frame cycle, charge generated in a photoelectric conversion element of the at least one pixel circuit in the range imaging device due to light incident from the measurement space by the at least one pixel circuit of the range imaging device, distributing the charge to each of the charge storage units for integration therein by performing switching operation of transfer transistors at predetermined timing synchronizing with emission of the light pulses by a pixel drive circuit of the range imaging device, and calculating, based on a charge determined by a first charge that is the charge integrated in each of the charge storage units, a distance between an object in the measurement space and a light-receiving unit by a distance calculation unit of the range imaging device. The distance calculation unit calculates the distance by subtracting a second charge from each of the first charges such that the second charge is a noise charge as an integrated charge other than the charge distributed to the charge storage units for integration therein by the switching operation of the transfer transistors.

According to yet another one aspect of the present invention, a range imaging method includes distributing, through switching operation of multiple transfer transistors of at least one pixel circuit in a range imaging device that transfer charge in a frame cycle from a photoelectric conversion element of the at least one pixel circuit to multiple charge storage units of the at least one pixel circuit, charge generated in the photoelectric conversion element due to incident light from a measurement space to each of N charge storage units for integration therein in a predetermined integration cycle synchronizing with emission of light pulses, where $N \geq 3$, by a pixel drive circuit of the range imaging device, estimating, by a noise charge estimation unit of the range imaging device, second charge from an ambient light charge using a noise charge inflow ratio between the ambient light charge and a noise charge such that the ambient light charge is generated due to ambient light in the measurement space and distributed to the charge storage units for integration therein via the transfer transistors and that the noise charge is generated due to the ambient light and flowing into the charge storage units for integration therein without passing through the transfer transistors, and calculating a distance to an object using a corrected charge obtained by subtracting the second charge from each of first charges integrated in the charge storage units by a distance calculation section of the range imaging device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9 is a diagram illustrating processing of acquiring noise charge integrated in charge storage units according to a third embodiment of the present invention;

FIG. 10 is a conceptual diagram illustrating noise charge corresponding to reflected light in charge storage units in a ranging charge acquisition mode according to the third embodiment of the present invention;

DETAILED DESCRIPTION OF THE EMBODIMENTS

Figure 1:
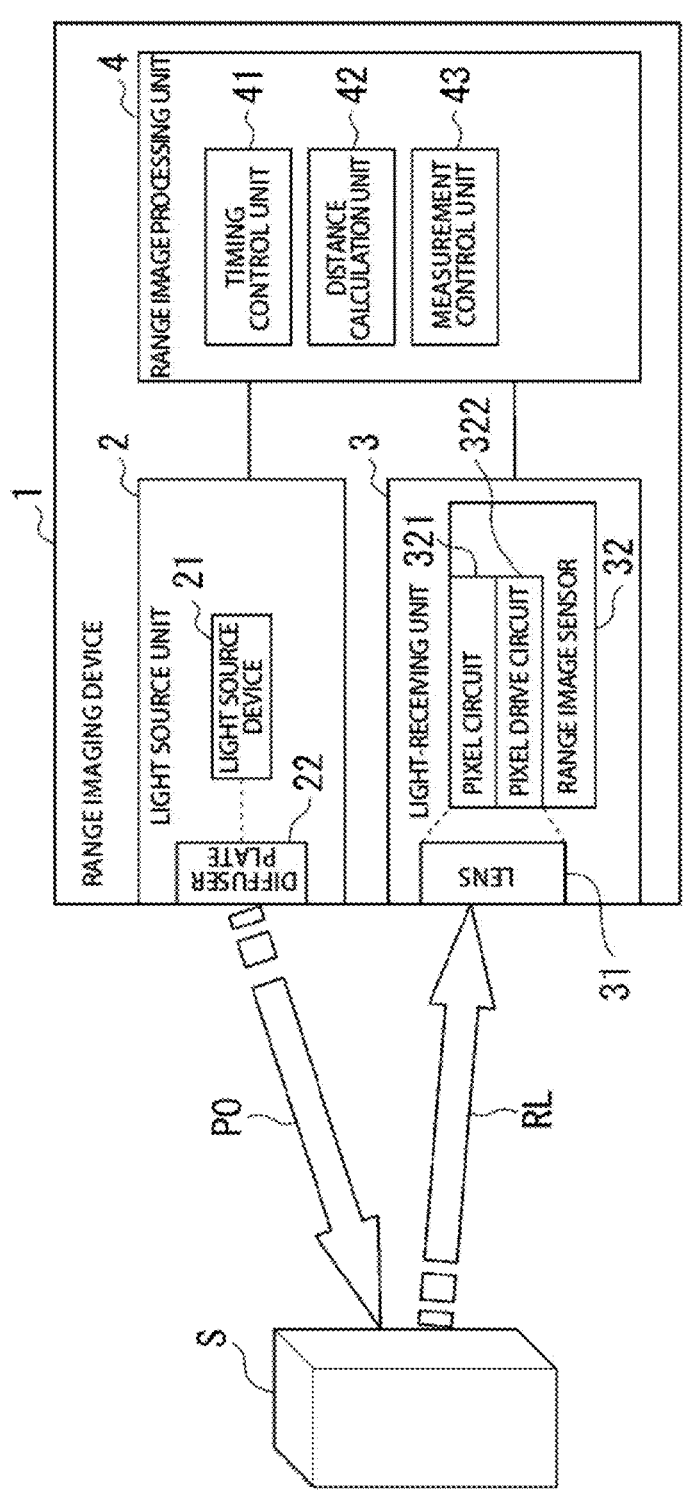
FIG. 1 is a schematic block diagram illustrating a configuration of a range imaging device according to a first embodiment of the present invention.

Embodiments will now be described with reference to the accompanying drawings, wherein like reference numerals designate corresponding or identical elements throughout the various drawings.

First Embodiment

FIG. 1 is a schematic block diagram illustrating a configuration of a range imaging device according to a first embodiment of the present invention. A range imaging device 1 configured as shown in FIG. 1 includes a light source unit 2, a light-receiving unit 3, and a range image processing unit 4. FIG. 1 also shows an object S whose distance is to be measured by the range imaging device 1. A range imaging element may be, for example, a range image sensor 32 (described later) in the light-receiving unit 3.

The light source unit 2 emits light pulses PO into a space as an imaging target where the object S is present whose distance is to be measured by the range imaging device 1 under the control of the range image processing unit 4. The light source unit 2 may be, for example, a surface-emitting semiconductor laser module such as a vertical-cavity surface-emitting laser (VCSEL). The light source unit 2 includes a light source device 21 and a diffuser plate 22.

The light source device 21 is a light source that emits laser light in the near infrared wavelength band (e.g., wavelength band of 850 nm to 940 nm) which serves as the light pulses PO to be emitted to the object S. The light source device 21 may be, for example, a semiconductor laser light emitting device. The light source device 21 emits pulsed laser light under the control of a timing control unit 41.

The diffuser plate 22 is an optical component that diffuses laser light in the near infrared wavelength band emitted from the light source device 21 over the emission surface area of the object S. Pulsed laser light diffused by the diffuser plate 22 is emitted as the light pulses PO and applied to the object S.

The light-receiving unit 3 receives reflected light RL arising from reflection of the light pulses PO from the object S, which is the object whose distance is to be measured by the range imaging device 1, and outputs a pixel signal according to the received reflected light RL. The light-receiving unit 3 includes a lens 31 and a range image sensor 32.

The lens 31 is an optical lens that guides the incident reflected light RL to the range image sensor 32. The lens 31 outputs the incident reflected light RL toward the range image sensor 32, so that the light can be received by (be incident on) pixel circuits provided to the light-receiving region of the range image sensor 32.

The range image sensor 32 is an imaging device used for the range imaging device 1. The range image sensor 32 includes multiple pixel circuits 321 disposed in a two-dimensional light-receiving region, and a pixel drive circuit 322 that controls the pixel circuits 321.

The pixel circuits 321 each include one photoelectric conversion element (e.g., photoelectric conversion element PD described later), multiple charge storage units (e.g., charge storage units CS1 to CS4 described later) corresponding to this photoelectric conversion element, and components that distribute charge to the individual charge storage units.

The range image sensor 32 distributes charge, which has been generated by the photoelectric conversion element under the control of the timing control unit 41, to the charge storage units. Also, the range image sensor 32 outputs pixel signals according to the charge distributed to the charge storage units. The range image sensor 32, in which multiple pixel circuits are formed in a two-dimensional matrix, outputs single-frame pixel signals corresponding to the respective pixel circuits.

The range image processing unit 4 controls the range imaging device 1 and calculates the distance to the object S. The range image processing unit 4 includes the timing control unit 41, a distance calculation unit 42, and a measurement control unit 43.

The timing control unit 41 controls timing of outputting several control signals required for measuring a distance, under the control of the measurement control unit 43. The various control signals refer to, for example, a signal for controlling emission of the light pulses PO, a signal for distributing the reflected light RL to the charge storage units, a signal for controlling the distribution count per frame, and other signals. The distribution count refers to the number of times of repetition of the processing for distributing charge to the charge storage units CS (see FIG. 3).

The distance calculation unit 42 outputs distance information indicating a distance to the object S calculated based on the pixel signals outputted from the range image sensor 32, under the control of the measurement control unit 43. The distance calculation unit 42 calculates a delay time Td from when the light pulses PO are emitted until when the reflected light RL is received, based on the charge (first charge) integrated in the charge storage units CS. The distance calculation unit 42 calculates a distance from the range imaging device 1 to the object S according to the calculated delay time Td.

The measurement control unit 43 selects a mode of each of the frames repeated in a frame cycle, from a noise charge acquisition mode that is a frame of acquiring charge noise and a ranging charge acquisition mode that is a normal frame of performing ranging.

The measurement control unit 43 controls timing for the timing control unit 41 and controls calculation for the distance calculation unit 42, according to the noise charge acquisition mode and the ranging charge acquisition mode (described in detail later). The noise charge refers to charge which is generated in the region other than the photoelectric conversion element due to incident light (ambient light and reflected light) from the measurement space and integrated in the charge storage units CS. Specifically, the noise charge is integrated charge other than the charge distributed and integrated by switching operation of the transfer transistors G.

More specifically, the range imaging device according to the present embodiment calculates the distance between the object and the range image sensor 32 based on the charge integrated in the charge storage units CS. Thus, irrespective of the charge that is read at predetermined timing from the photoelectric conversion element, noise charge due to ambient light or the like is integrated in the charge storage units CS until the time point of the reading performed in each frame, and therefore, the accuracy of the distance calculated in ranging is deteriorated.

With this configuration, in the range imaging device 1, the light source unit 2 emits the light pulses PO in the near infrared wavelength band to the object S, the light-receiving unit 3 receives the reflected light RL arising from reflection of the light pulses PO from the object S, and the range image processing unit 4 outputs distance information indicating the distance between the object S and the range imaging device 1.

Although FIG. 1 shows a range imaging device 1 configured to include the range image processing unit 4 inside thereof, the range image processing unit 4 may be a component provided external to the range imaging device 1.

Figure 2:
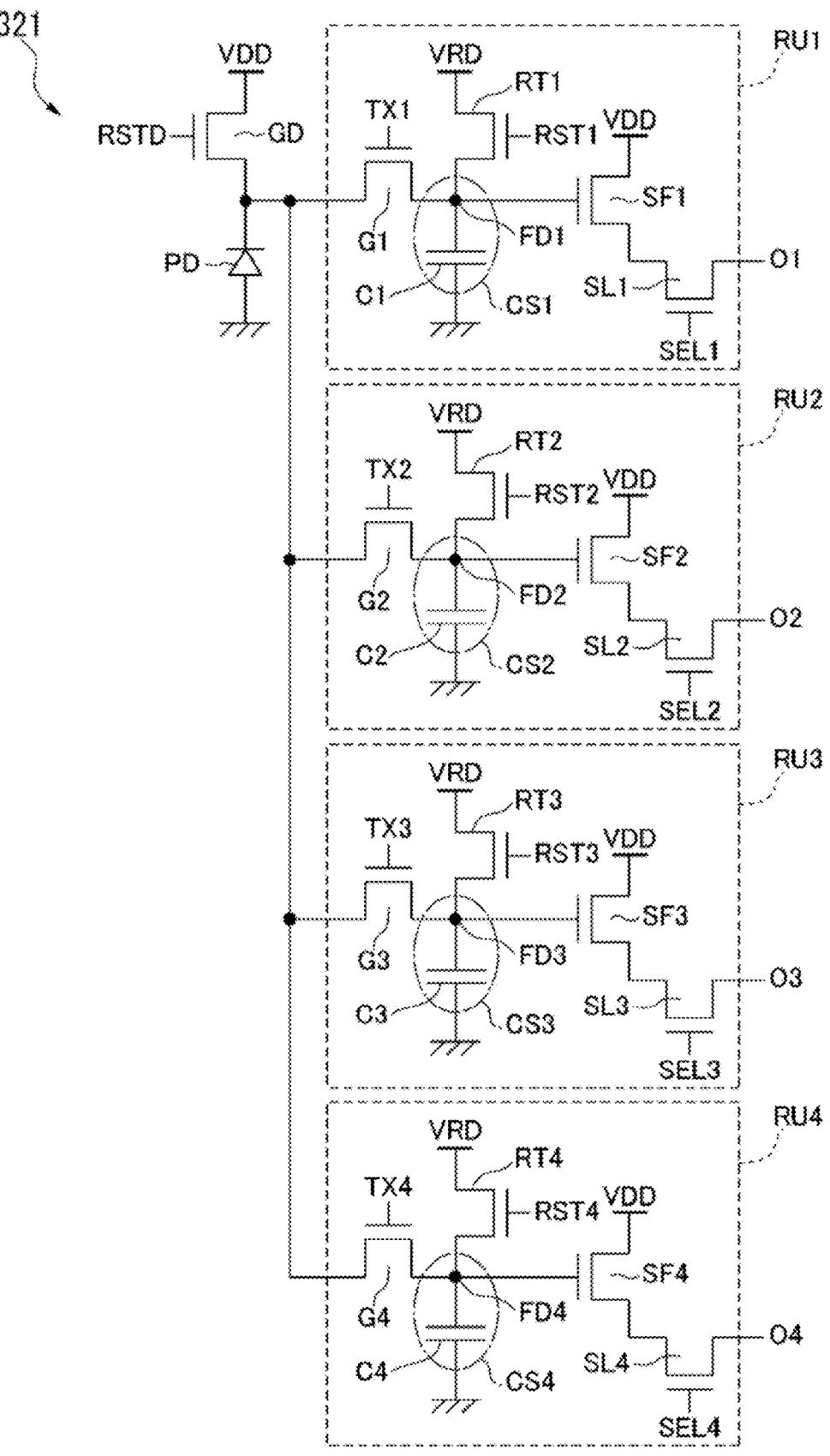
FIG. 2 is a circuit diagram illustrating an example of a configuration of a pixel circuit disposed in a range image sensor in a range imaging device according to the first embodiment of the present invention.

Next, the configuration of a pixel circuit 321 in the range image sensor 32 will be described. FIG. 2 is a circuit diagram illustrating an example of a configuration of a pixel circuit 321 disposed in the range image sensor 32 in the range imaging device according to the first embodiment of the present invention. The pixel circuit 321 shown in FIG. 2 is a configuration example including four pixel signal readouts RU1 to RU4.

The pixel circuit 321 includes one photoelectric conversion element PD, a charge discharge transistor GD (GD1 or GD2 described later), and four pixel signal readouts RU (RU1 to RU4) which output voltage signals from respective output terminals O. Each of the pixel signal readouts RU includes a transfer transistor G, floating diffusion FD, charge storage capacitor C, reset transistor RT, source follower transistor SF, and selection transistor SL. The floating diffusion FD and the charge storage capacitor C configure a charge storage unit CS.

In the pixel circuit 321 shown in FIG. 2, the pixel signal readout RU1 which outputs a voltage signal from an output terminal O1 includes a transfer transistor G1 (transfer MOS transistor), floating diffusion FD1, charge storage capacitor C1, reset transistor RT1, source follower transistor SF1, and selection transistor SL1. In the pixel signal readout RU1, the floating diffusion FD1 and the charge storage capacitor C1 configure a charge storage unit CS1. The pixel signal readouts RU2, RU3, RU4 are configured similarly.

The photoelectric conversion element PD is an embedded photodiode which performs photoelectric conversion of incident light, generates charge corresponding to the incident light, and integrates the generated charge. In the present embodiment, incident light is incident from a space targeted for measurement.

In the pixel circuit 321, charge generated by photoelectric conversion of incident light by the photoelectric conversion element PD is distributed to each of the four charge storage units CS (CS1 to CS4), and voltage signals corresponding to the distributed charge are outputted to a pixel signal processing circuit 325.

The configuration of each pixel circuit disposed in the range image sensor 32 is not limited to the configuration, as shown in FIG. 2, provided with the four pixel signal readouts RU (RU1 to RU4), but the pixel circuit may be configured to include one or more pixel signal readouts RU.

In response to each pixel circuit 321 of the range imaging device 1 being driven, the light pulses PO are emitted during an emission period To and the reflected light RL is received by the range image sensor 32 after the delay time Td. Under the control of the timing control unit 41, the pixel drive circuit 322 supplies integration drive signals TX1 to TX4 to the transfer transistors G1, G2, G3, G4 according to their respective timings synchronizing with emission of the light pulses PO to distribute charge generated in the photoelectric conversion element PD for sequential integration in the charge storage units CS1, CS2, CS3, CS4.

The pixel drive circuit 322 controls the reset transistors RT and the selection transistors SL using respective drive signals RST and SEL, converts the charge integrated in the charge storage units CS into electrical signals using the source follower transistors SF, and outputs the converted electrical signals to the distance calculation unit 42 via the terminals O.

Under the control of the timing control unit 41, the pixel drive circuit 322 passes and discharges the charge generated in the photoelectric conversion element PD to power sources VDD using a drive signal RSTD (eliminates the charge).

Figure 3:
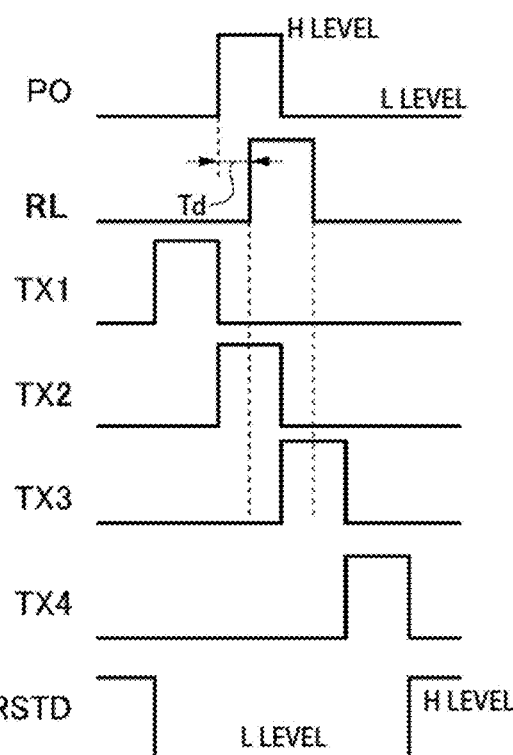
FIG. 3 is a timing chart illustrating transfer of electrical charge generated in a photoelectric conversion element to individual charge storage units.

FIG. 3 is a timing chart illustrating transfer of charge generated in the photoelectric conversion element PD to the individual charge storage units CS.

In the timing chart of FIG. 3, the vertical axis indicates pulse level and the horizontal axis indicates time. The timing chart shows a correlation between the light pulses PO and the reflected light RL on the time axis, timing of integration drive signals TX1 to TX4 supplied to the respective transfer transistors G1 to G4, and timing of the drive signal RSTD supplied to the charge discharge transistor GD.

The timing control unit 41 causes the light source unit 2 to emit the light pulses PO into the measurement space. Thus, the light pulses PO are reflected by the object and received by the light-receiving unit 3 as the reflected light RL. Also, the photoelectric conversion element PD generates charge corresponding to ambient light and the reflected light RL. The pixel drive circuit 322, which transfers charge generated in the photoelectric conversion element PD to the charge storage units CS1 to CS4, performs switching control for the transfer transistors G1 to G4.

In other words, the pixel drive circuit 322 supplies the integration drive signals TX1 to TX4 to the transfer transistors G1 to G4 as H-level signals with a predetermined duration (the same duration as the emission period To).

For example, the pixel drive circuit 322 turns on the transfer transistor G1 provided on the transfer path through which charge is transferred to the charge storage unit CS1 from the photoelectric conversion element PD. Thus, the charge photoelectrically converted by the photoelectric conversion element PD is integrated in the charge storage unit CS1 via the transfer transistor G1. After that, the pixel drive circuit 322 turns off the transfer transistor G1. Thus, charge transfer to the charge storage unit CS1 is stopped. In this way, the pixel drive circuit 322 causes the charge storage unit CS1 to integrate charge. The same applies to other charge storage units CS2, CS3, CS4.

In this case, in a charge integration period in which charge is distributed to the charge storage units CS (period in which charge is integrated in the charge storage units CS in a frame), the integration cycle is repeated so that the integration drive signals TX1, TX2, TX3, TX4 are supplied to the transfer transistors G1, G2, G3, G4.

Thus, charge corresponding to the incident light is transferred to the charge storage units CS1, CS2, CS3, CS4 from the photoelectric conversion element PD via the transfer transistors G1, G2, G3, G4. The integration cycle is repeated multiple times in the charge integration period.

Thus, charge is integrated in the charge storage units CS1, CS2, CS3, CS4 every integration cycle of each of the charge storage units CS1, CS2, CS3, CS4 during the charge integration period.

When repeating the integration cycle for each of the charge storage units CS1, CS2, CS3, CS4, after completing charge transfer (distribution) to the charge storage unit CS4, the pixel drive circuit 322 turns on the charge discharge transistor GD provided on the discharge path through which charge is discharged from the photoelectric conversion element PD, by supplying an H-level drive signal RSTD.

Thus, the charge discharge transistor GD discards the charge generated in the photoelectric conversion element PD before restarting the integration cycle for the charge storage unit CS1 and after completing the previous integration cycle for the charge storage unit CS4 (i.e., the photoelectric conversion element PD is reset). In other words, the charge discharge transistor GD, or at least one discharge transistor GD, discharges the charge from the photoelectric conversion element PD, discharging it in a period other than the period when the charge generated in the photoelectric conversion element PD due to incident light is distributed to and integrated in the individual chare storage units CS1, CS2, CS3, CS4.

The pixel drive circuit 322 sequentially performs signal processing such as A/D conversion processing for the voltage signals from all the pixel circuits 321 disposed in the light-receiving unit 3 for each row (horizontal array) of the pixel circuits 321.

After that, the pixel drive circuit 322 sequentially outputs the voltage signals subjected to signal processing to the distance calculation unit 42, in the order of columns of the pixel circuits disposed in the light-receiving unit 3.

As described above, the pixel drive circuit 322 repeatedly integrates charge in the charge storage units CS and discards charge photoelectrically converted by the photoelectric conversion element PD in a single frame. Thus, charge corresponding to the intensity of light received by the range imaging device 1 in a predetermined time interval is integrated in the individual charge storage units CS. The pixel drive circuit 322 outputs electrical signals corresponding to single-frame charge integrated in the charge storage units CS to the distance calculation unit 42.

Due to the relationship between the timing of emission of the light pulses PO and the timing of integrating charge in each of the charge storage units CS (CS1 to CS4) (integration timing), charge corresponding to external light components, such as an ambient light component before emission of the light pulses PO, is held in the charge storage unit CS1. Also, charge corresponding to the reflected light RL and the external light component are distributed to and held in the charge storage units CS2, CS3, CS4. Distribution of charge to the charge storage units CS2, CS3 or the charge storage units CS3, CS4 (distribution ratio) can be a ratio according to the delay time Td from when the light pulses PO are reflected by the object S until when the reflected light is incident on the range imaging device 1.

Referring back to FIG. 1, the distance calculation unit 42 calculates a delay time Td using this principle through the following Formula (1) or Formula (2).

$$Td = To \times (Q3 - Q1)/(Q2 + Q3 - 2 \times Q1) \tag{1}$$

$$Td = To + To \times (Q4 - Q1)/(Q3 + Q4 - 2 \times Q1) \tag{2}$$

where To represents the period of emission of the light pulses PO, Q1 represents charge integrated in the charge storage unit CS1, Q2 represents charge integrated in the charge storage unit CS2, Q3 represents charge integrated in the charge storage unit CS3, and Q4 represents charge integrated in the charge storage unit CS4. For example, if Q4=Q1, the distance calculation unit 42 calculates a delay time Td using Formula (1) and, if Q2=Q1, calculates a delay time Td using Formula (2).

In Formula (1), charge generated due to reflected light is integrated in the charge storage units CS2, CS3, but is not integrated in the charge storage unit CS4. In Formula (2), charge generated due to reflected light is integrated in the charge storage units CS3, CS4, but is not integrated in the charge storage unit CS2.

In Formula (1) or (2), of the charges integrated in the charge storage units CS2, CS3, CS4, the component corresponding to the external light component is assumed to be the same in amount as the charge integrated in the charge storage unit CS1.

The distance calculation unit 42 multiplies the delay time calculated through Formula (1) or (2) by the speed of light (velocity) to calculate a round-trip distance to the object S.

Then, the distance calculation unit 42 calculates ½ of the round-trip distance calculated above (delay time Td×c (light velocity)/2) to calculate the distance to the object S from the range image sensor 32 (i.e., the range imaging device 1).

Figure 4:
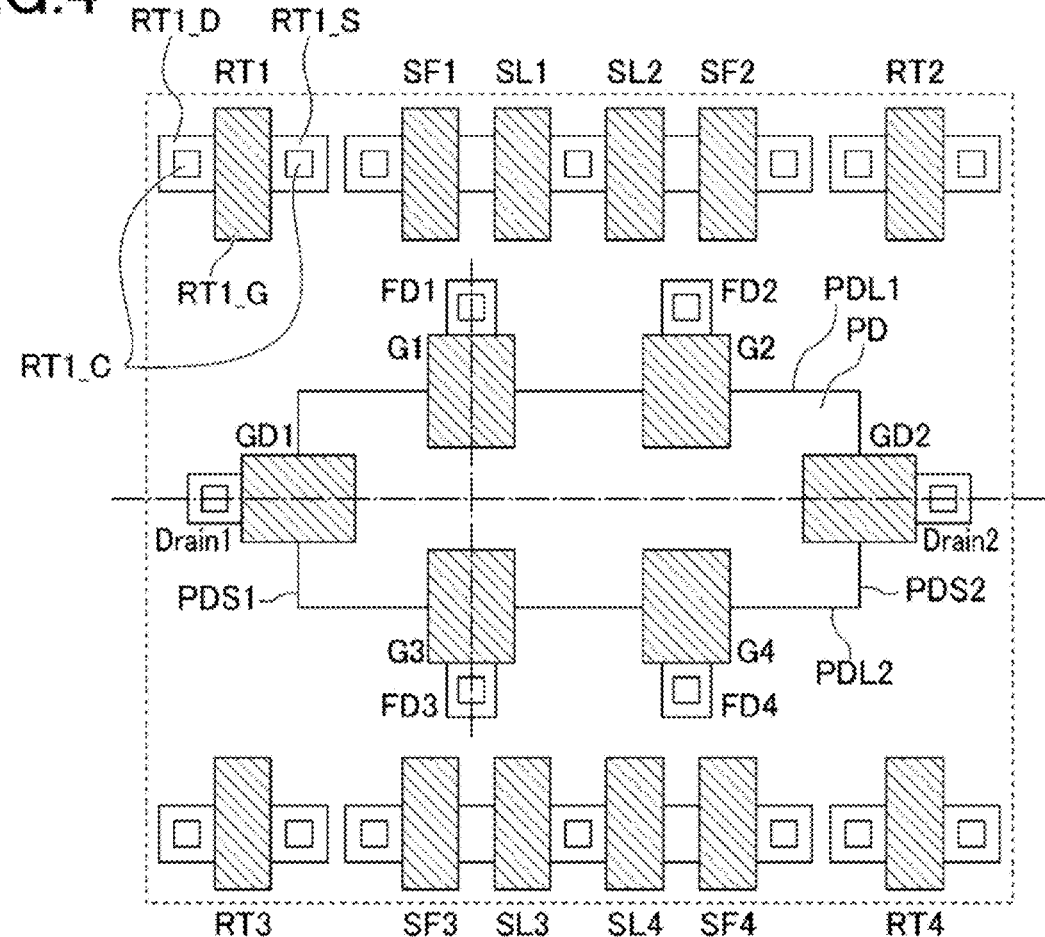
FIG. 4 is a diagram illustrating an example of an arrangement (layout pattern) of transistors of a pixel circuit according to an embodiment of the present invention.

FIG. 4 is a diagram illustrating an example of an arrangement (layout pattern) of the transistors of the pixel circuit 321 according to the present embodiment.

The layout pattern of FIG. 4 is a layout pattern of the pixel circuit 321 of FIG. 3 (i.e., the pixel circuit 321 of FIG. 2).

FIG. 4 shows an arrangement pattern of the transfer transistors G1, G2, G3, G4, the source follower transistors SF1, SF2, SF3, SF4, the selection transistors SL1, SL2, SL3, SL4, the reset transistors RT1, RT2, RT3, RT4, the charge discharge transistors GD1, GD2, and the photoelectric conversion element PD. The transistors mentioned above are all n-channel MOS transistors formed on a p-type semiconductor substrate.

For example, the reset transistor RT1 is configured by a drain RT1_D (n-type diffusion layer (diffusion layer having n-type impurities)), source RT1_S (n-type diffusion layer), and gate RT1_G on a p-type semiconductor substrate.

A contact RT1_C is a pattern indicating contacts provided in respective diffusion layers, i.e., the drain RT1_D (n-type diffusion layer) and the source RT1_S (n-type diffusion layer) of the reset transistor RT1, and connected to wiring, not shown. The transfer transistors G1 to G4, the source follower transistors SF1 to SF4, the selection transistors SL1 to SL4, the reset transistors RT2 to RT4, and the charge drainage transistors GD1, GD2 are similarly configured.

The photoelectric conversion element PD, which is in a rectangular shape, has a long side PDL1, long side PDL2 facing PDL1 in parallel, short side PDS1, and short side PDS2 facing PDS1 in parallel.

The transfer transistor G1 is formed of the floating diffusion FD1 as a drain, a gate G1_G, and a source (n-type diffusion layer of the photoelectric conversion element PD). The floating diffusion FD1 is a diffusion layer (n-type diffusion layer) as a drain of the transfer transistor G1, and stores charge from the photoelectric conversion element PD.

A drain G1_D is connected to each of a gate SF1_G of the source follower transistor SF1 and the source RT1_S of the reset transistor RT1 by a contact G1_C via wiring, not shown. The transfer transistors G2, G3, G4 are configured similarly to the transfer transistor G1.

FIG. 4 shows a transistor arrangement of the pixel circuit 321 on the semiconductor substrate, omitting the wiring pattern and the charge storage capacitors (C1 to C4). Accordingly, the charge storage units CS1, CS2, CS3, CS4 are located at the positions of the floating diffusions FD1, FD2, FD3, FD4, respectively.

In FIG. 4, for example, the floating diffusion FD1 of the charge storage unit CS1 is connected, via p-n junction, to the transfer transistor G1, the selection transistor SL1, the source follower transistor SF1, and the reset transistor RT1 in the vicinity of the charge storage unit CS1, generating noise charge due to application of incident light.

Thus, since the charge storage unit CS1 is reset to the voltage of a power source VRD by the reset transistor and in a high potential state, the noise charge is injected into the charge storage unit CS1 by the electrical field produced due to potential difference.

Resultantly, the noise charge is integrated in the charge storage unit CS1. During the period when charge is integrated in the charge storage units CS and the period before the charge is read from the charge storage units CS, incident light is continuously applied to all the charge storage units CS1 to CS4, and therefore, the ratio of noise charge in the charge integrated in each of the charge storage units CS increases.

Similarly to the charge storage unit CS1, the charge storage units CS2 to CS4 each receive and integrate therein a flow of noise charge generated by the transistors located in the vicinities.

Therefore, the accuracy of the distance calculated using Formula (1) or (2) is deteriorated due to mixing of noise charge into the charges Q1, Q2, Q3, Q4 used for the calculation.

Figure 5:
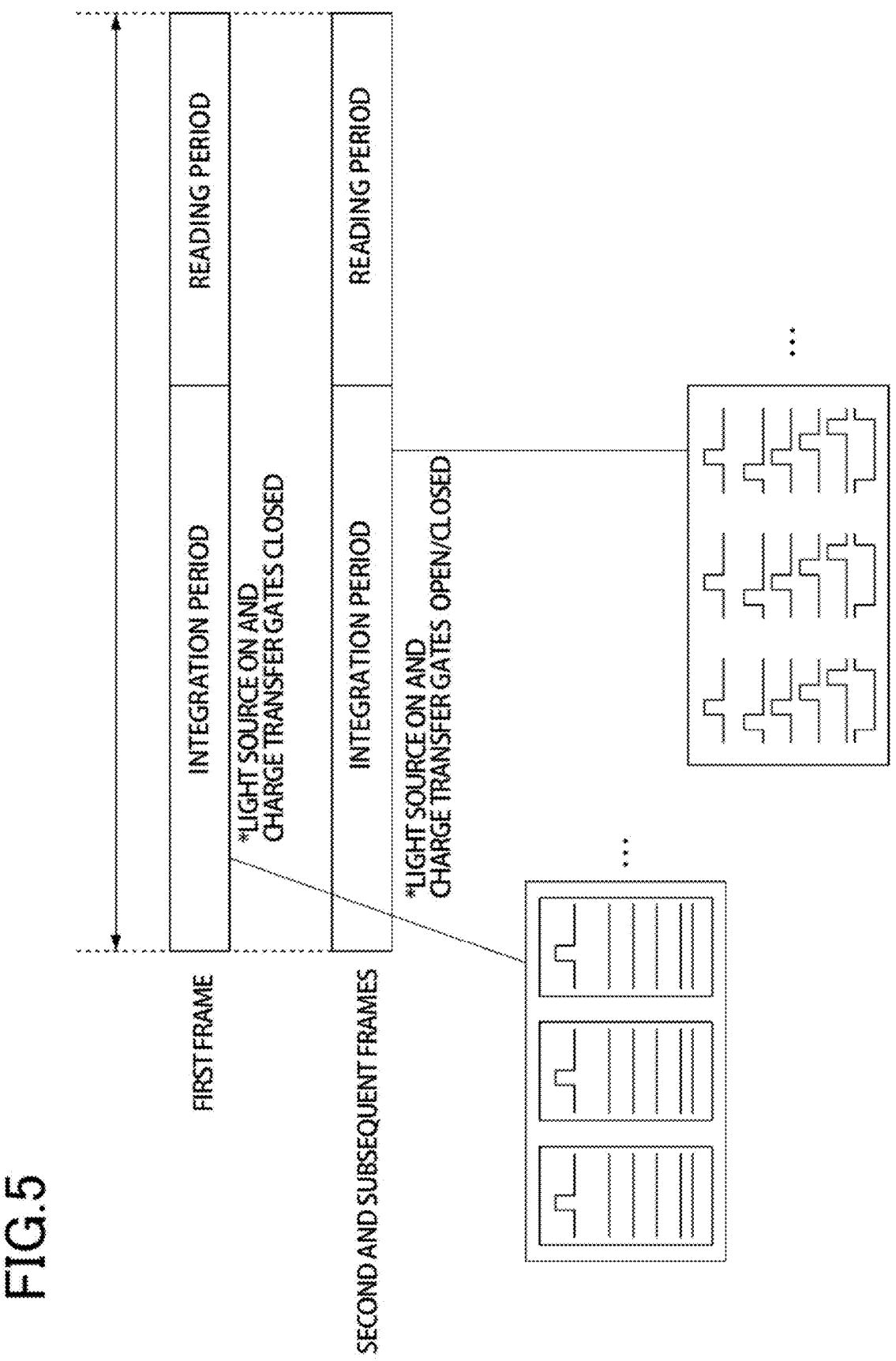
FIG. 5 is a diagram illustrating processing of acquiring noise charge integrated in charge storage units according to a second embodiment of the present invention.

As shown in FIG. 5, the present embodiment performs processing of detecting noise charge integrated in each of the charge storage units CS. FIG. 5 is a diagram illustrating processing of acquiring noise charge integrated in each of the charge storage units CS, according to the present embodiment. In FIG. 5, the integration period corresponds to the period in which charge is integrated in the charge storage units CS in a frame, i.e., in which the processing of distributing charge from the photoelectric conversion element PD to the charge storage units CS described above is performed every integration cycle repeated by a predetermined number of times. The reading period (readout period) is a period in which the charge integrated in each of the charge storage units CS in a frame is read out, i.e., in which the charges integrated in the individual charge storage units CS of the pixel circuit 321 of the range image sensor 32 are sequentially read out and outputted to the distance calculation unit 42.

The measurement control unit 43 controls the timing control unit 41 to perform control of changing the output timing for the integration drive signals TX1, TX2, TX3, TX4 and the drive signal RSTD from the pixel drive circuit 322, between the noise charge acquisition mode and the ranging charge acquisition mode.

The noise charge acquisition mode refers to a mode performed in the first frame when starting ranging, in which the noise charges (second charges) QNS1 to QNS4 integrated in the respective charge storage units CS1 to CS4 are calculated.

The ranging charge acquisition mode refers to a mode in which charges generated in the photoelectric conversion element PD due to incident light including the reflected light RL and integrated in the respective charge storage units CS1 to CS4 are acquired.

When ranging is started in the range imaging device 1, the measurement control unit 43 controls the timing control unit 41 so that the operation of the pixel drive circuit 322 in the first frame is performed in the noise charge acquisition mode, and the operation of the pixel drive circuit 322 in the second and the subsequent frames is performed in the ranging charge acquisition mode.

Figures 6A, 6B:
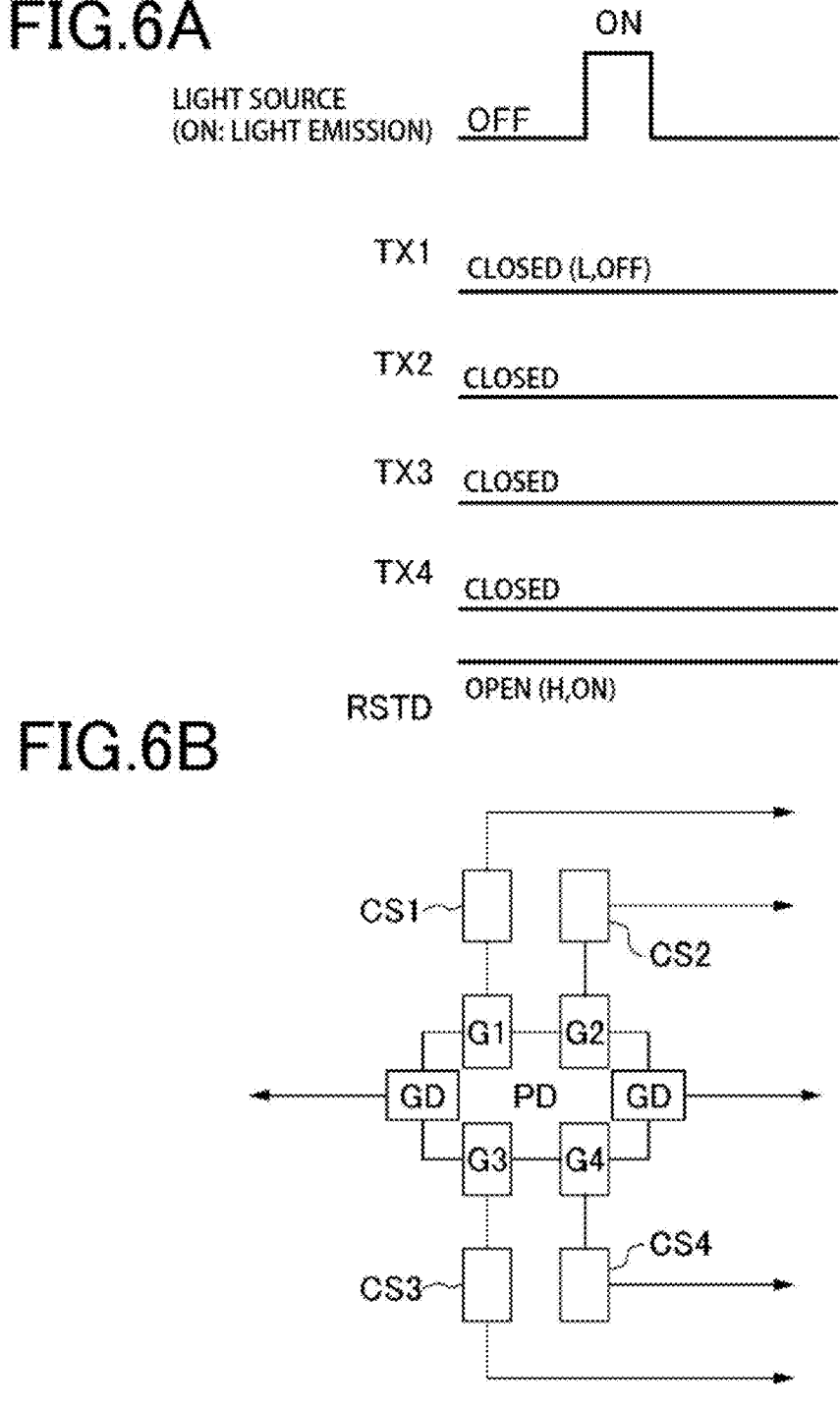
FIG. 6A is a conceptual diagram illustrating charge integration processing for charge storage units in a noise charge acquisition mode.
FIG. 6B is a conceptual diagram illustrating charge integration processing for charge storage units in a noise charge acquisition mode.

FIGS. 6A and 6B are conceptual diagrams each illustrating charge integration processing for the charge storage units CS (CS1, CS2, CS3, CS4) in the noise charge acquisition mode.

FIG. 6A is a timing chart illustrating timing of emission of the light pulses PO, and timing of the integration drive signals TX1, TX2, TX3, TX4 and the drive signal RSTD in the noise charge acquisition mode. In FIG. 6A, the horizontal axis indicates time and the vertical axis indicates signal level (H level (ON) or L level (OFF)).

FIG. 6B is a conceptual diagram simplifying FIG. 4 and illustrating a configuration concept for the photoelectric conversion element PD, the transfer transistors G1, G2, G3, G4, and the charge storage units CS1, CS2, CS3, CS4.

As shown in FIG. 6A, in the noise charge acquisition mode, the integration drive signals TX1, TX2, TX3, TX4 are all at L level in the integration period, i.e., in all the integration cycles in the charge integration period, and therefore, the individual transfer transistors G1, G2, G3, G4 remain in the off state.

In this case, the light pulses PO are emitted at a predetermined time every integration cycle, the drive signal RSTD is at the H level, and the charge discharge transistors GD1, GD2 remain in the on state.

Accordingly, the charge generated in the photoelectric conversion element PD is completely discharged to the power source VDD. Thus, since the transfer transistors G1, G2, G3, G4 are in the off state, no charge from the photoelectric conversion element PD is integrated in the charge storage units CS1, CS2, CS3, CS4.

Accordingly, charges integrated in charge storage units CS are charges generated in the charge storage units CS due to incident light (ambient light and reflected light RL) and the noise charge generated in the circuit components in the vicinities of the charge storage units CS.

Thus, the noise charges QNS1, QNS2, QNS3, QNS4 are integrated in the respective charge storage units CS1, CS2, CS3, CS4 in the integration period.

In the reading period, the pixel drive circuit 322 reads the noise charges QNS1, QNS2, QNS3, QNS4 of the respective charge storage units CS1, CS2, CS3, CS4 from each of the pixel circuits 321, and outputs the read charges to the distance calculation unit 42 as predetermined electrical signals.

To simplify description, these signals are described as noise charges QNS1, QNS2, QNS3, QNS4 below.

The distance calculation unit 42 stores the noise charges QNS1, QNS2, QNS3, QNS4 of each pixel circuit 321 in a storage (e.g., provided to the range image processing unit 4), not shown.

With the processing described above performed, the noise charge acquisition mode is terminated.

Figure 7A:
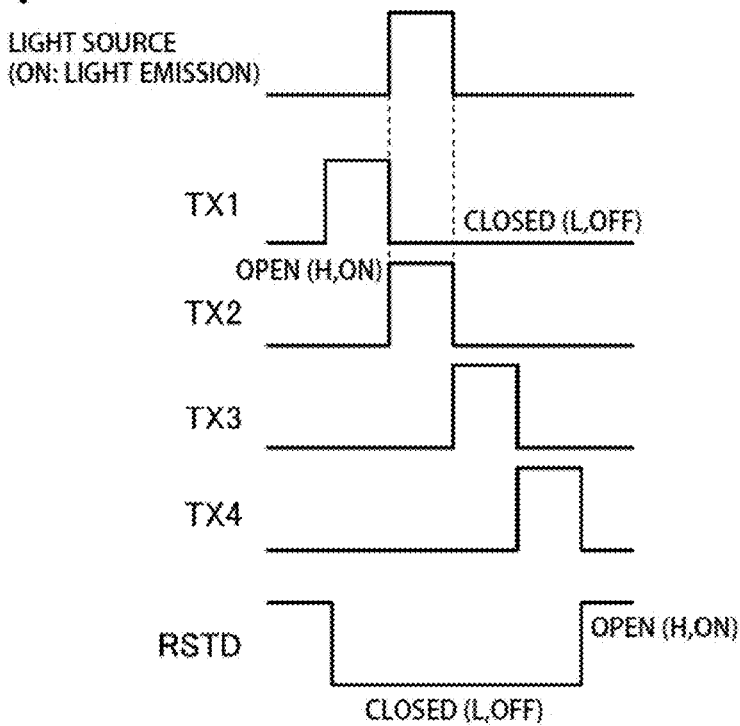
FIG. 7A is a conceptual diagram illustrating charge integration processing for charge storage units in a ranging charge acquisition mode.
Figure 7B:
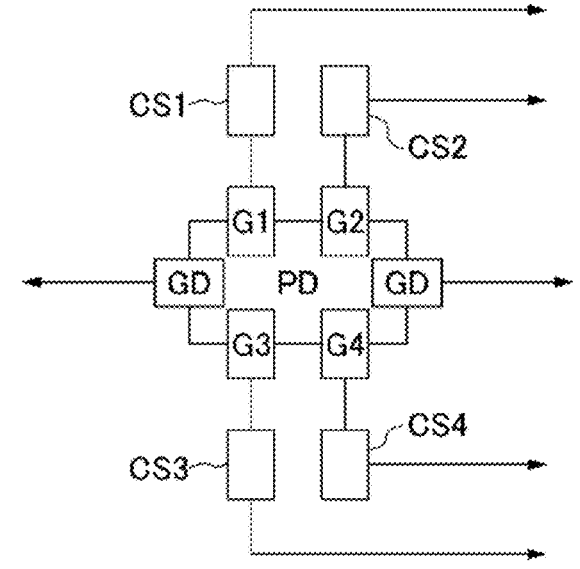
FIG. 7B is a conceptual diagram illustrating charge integration processing for charge storage units in a ranging charge acquisition mode.

FIGS. 7A and 7B are conceptual diagrams each illustrating charge integration processing for the charge storage units CS (CS1, CS2, CS3, CS4) in the ranging charge acquisition mode.

FIG. 7A is a timing chart illustrating timing of emission of the light pulses PO, and timing of the integration drive signals TX1, TX2, TX3, TX4 and the drive signal RSTD in the ranging charge acquisition mode. In FIG. 7A, the horizontal axis indicates time and the vertical axis indicates signal level (H level (ON) or L level (OFF)).

FIG. 7B is a conceptual diagram simplifying FIG. 4 and illustrating a configuration concept for the photoelectric conversion element PD, the transfer transistors G1, G2, G3, G4, and the charge storage units CS1, CS2, CS3, CS4.

As shown in FIG. 7A, in the ranging charge acquisition mode, the integration drive signals TX1 to TX4 are controlled to be at the H level or L level at a predetermined timing, the transfer transistors G1, G2, G3, G4 are switched, and charge is distributed to each of the charge storage units CS1, CS2, CS3, CS4 from the photoelectric conversion element PD in the integration period, i.e., in all the integration cycles in the charge integration period.

In this case, the light pulses PO are emitted at a predetermined time every integration cycle, the drive signal RSTD is at the L level, and the charge discharge transistors GD1, GD2 remain in the off state in the charge distribution period for the charge storage units CS1, CS2, CS3, CS4.

Thus, the charge generated in the photoelectric conversion element PD is transferred to the charge storage units CS1, CS2, CS3, CS4 via the respective transfer transistors G1, G2, G3, G4 for integration therein.

Accordingly, the charge Q integrated in each charge storage unit CS includes the charge distributed from the photoelectric conversion element PD, being mixed with the charge generated in the charge storage unit CS due to incident light (ambient light and reflected light RL) and the noise charge generated in the circuit components in the vicinity of the charge storage unit CS.

In other words, the charges Q1, Q2, Q3, Q4 integrated in the respective charge storage units CS1, CS2, CS3, CS4 are mixed with the noise charges QNS1, QNS2, QNS3, QNS4.

In the reading period, the pixel drive circuit 322 reads the charges Q1, Q2, Q3, Q4 integrated in the respective charge storage units CS1, CS2, CS3, CS4 from each of the pixel circuits 321, and outputs the read charges to the distance calculation unit 42 as predetermined electrical signals. To simplify description, these signals are described as charges Q1, Q2, Q3, Q4 below.

The distance calculation unit 42 calculates, as described above, a delay time Td corresponding to the distance between the range image sensor 32 (i.e., each of the pixel circuits 321) and the object S based on the charges Q1, Q2, Q3, Q4 supplied from the range image sensor 32, using Formula (1) or (2).

In this case, the distance calculation unit 42 reads the noise charges QNS1, QNS2, QNS3, QNS4 stored in the storage, which are correlated to each pixel circuit 321.

The distance calculation unit 42 subtracts the noise charges QNS1, QNS2, QNS3, QNS4 from the respective charges Q1, Q2, Q3, Q4 to calculate corrected charges QC1, QC2, QC3, QC4.

In other words, the corrected charge QC1 (=Q1−QNS1), which is obtained by subtracting the noise charge QNS1 from the charge Q1, corresponds to the charge supplied from the photoelectric conversion element PD through distribution processing and integrated in the charge storage unit CS1. Similarly, the corrected charge QC2 (=Q2−QNS2), which is obtained by subtracting the noise charge QNS2 from the charge Q2, corresponds to the charge supplied from the photoelectric conversion element PD through distribution processing and integrated in the charge storage unit CS2. The corrected charge QC3 (=Q3−QNS3), which is obtained by subtracting the noise charge QNS3 from the charge Q3, corresponds to the charge supplied from the photoelectric conversion element PD through distribution processing and integrated in the charge storage unit CS3. The corrected charge QC4 (=Q4−QNS4), which is obtained by subtracting the noise charge QNS4 from the charge Q4, corresponds to the charge supplied from the photoelectric conversion element PD through distribution processing and integrated in the charge storage unit CS4.

The distance calculation unit 42 substitutes each of the corrected charges QC1, QC2, QC3, QC4 into Formula (1) or (2) as shown below to calculate a delay time Td.

$$Td = To \times (QC3 - QC1)/(QC2 + QC3 - 2 \times QC1) \qquad (1A)$$

$$Td = To + To \times (QC4 - QC1)/(QC3 + QC4 - 2 \times QC1) \qquad (2A)$$

In distance calculation in the second and the subsequent frames, the noise charges QNS1, QNS2, QNS3, QNS4 stored in the storage are read and subtracted from the respective charges Q1, Q2, Q3, Q4 to sequentially calculate the corrected charges QC1, QC2, QC3, QC4, followed by distance calculation using Formula (1A) or (2A).

With the above configuration, the present embodiment can calculate the distance between the object S and the range image sensor 32 by suppressing accuracy deterioration due to the effect of noise charge by acquiring noise charges QNS in advance generated in the charge storage units CS (CS1, CS2, CS3, CS4) and in the circuit components in the vicinities of the charge storage units CS in the frame (noise charge acquisition frame) of the noise charge acquisition mode and then, in the subsequent frames of the ranging charge acquisition mode, by subtracting the noise charges QNS from the respective charges Q distributed to the charge storage units CS for integration therein from the photoelectric conversion element PD through distribution processing to remove the noise charges mixed into the respective charges Q integrated in the charge storage units CS, and obtaining corrected charges QC generated in the photoelectric conversion element PD due to incident light.

The present embodiment described above has a configuration in which the first frame is in the noise charge acquisition mode when ranging is started by the range imaging device 1; however, the first frame in a group of given number of consecutive frames may be in the noise charge acquisition mode. For example, in a group of 100 consecutive frames, the first frame in the group may be in the noise charge acquisition mode, and 99 frames from the second frame may be in the ranging charge acquisition mode. The noise charge information in the storage may be overwritten by newly acquired noise charges QNS1, QNS2, QNS3, QNS4.

Alternatively, ranging processing may be performed by periodically (e.g., every 5 seconds, every minute, etc.) inserting a frame of the noise charge acquisition mode.

In the present embodiment described above, the noise charges QNS1, QNS2, QNS3, QNS4 in all the pixel circuits 321 of the range image sensor 32 are stored in the storage; however, in order to reduce the capacity of the storage, an average of the noise charges QNS1, QNS2, QNS3, QNS4 in the charge storage units CS1, CS2, CS3, CS4 of each pixel circuits 321 may be calculated for use as noise charge of all the charge storage units CS1, CS2, CS3, CS4.

Alternatively, the pixel circuits 321 of the range image sensor 32 may be divided into pixel circuit groups each formed of a predetermined number of pixel circuits 321, and noise charges QNS1, QNS2, QNS3, QNS4 of any of the pixel circuits 321 of each group may be used as representative values, or an average of each group may be calculated for use in the group.

Second Embodiment

With reference to the drawings, a second embodiment of the present invention will be described.

The second embodiment is configured similarly to the first embodiment shown in FIGS. 1 to 4. The second embodiment will be described below focusing on the operation different from the first embodiment.

Figure 8:
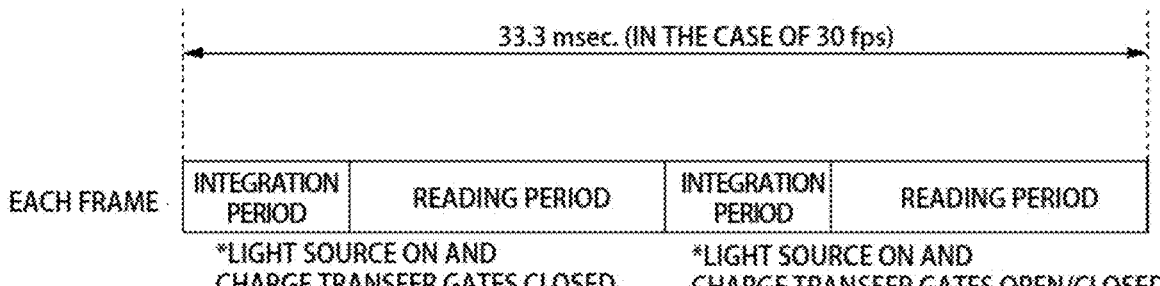
FIG. 8 is a diagram illustrating processing of acquiring noise charge integrated in charge storage units according to the second embodiment of the present invention.

FIG. 8 is a diagram illustrating processing of acquiring noise charge integrated in the charge storage units CS according to the present embodiment.

In FIG. 8, the integration period corresponds to the period in which charge is integrated in the charge storage units CS in a frame, i.e., in which the processing of distributing charge from the photoelectric conversion element PD to the charge storage units CS described above is repeated.

The reading period (readout period) is a period in which the charge integrated in the charge storage units CS in a frame is read out, i.e., in which the charges integrated in the individual charge storage units CS of the pixel circuit 321 of the range image sensor 32 are sequentially read out. In the present embodiment, the duration of each frame is 33.3 msec (milliseconds) and the frame cycle is 30 frames per second (30 fps).

In the second embodiment, as shown in FIG. 8, each frame is divided into a first sub-frame and a second sub-frame, so that the processing in the noise charge acquisition mode can be performed in the first sub-frame and the processing in the ranging charge acquisition mode can be performed in the second sub-frame. The processing in the noise charge acquisition mode and the processing in the ranging charge acquisition mode are performed as in the first embodiment.

The first and second sub-frames are each provided with an integration period and a reading period.

In the integration period of the first sub-frame, the noise charges QNS1, QNS2, QNS3, QNS4 are acquired, and these noise charges are read in the reading period and outputted to the range image processing unit 4. Thus, the distance calculation unit 42 stores the inputted noise charges QNS1, QNS2, QNS3, QNS4 into the storage.

In the integration period of the second sub-frame, the charges Q1, Q2, Q3, Q4 are acquired, and these charges are read in the reading period and outputted to the range image processing unit 4.

Thus, the distance calculation unit 42 subtracts the noise charges QNS1, QNS2, QNS3, QNS4 from the respective inputted charges Q1, Q2, Q3, Q4 to calculate corrected charges QC1, QC2, QC3, QC4.

Also, the distance calculation unit 42 calculates a delay time Td for calculating the distance from the range image sensor 32 to the object S based on the calculated corrected charges QC1, QC2, QC3, QC4, using Formula (1A) or (2A).

The reading period, which is used for reading the noise charges QNS1, QNS2, QNS3, QNS4 or the charges Q1, Q2, Q3, Q4 from each of the pixel circuits 321 of the range image sensor 32, cannot be shortened.

Therefore, the integration period for integrating charge in the charge storage units CS is shortened (the number of integration cycles is reduced) in order to maintain the reading period for reading charge from the charge storage units CS.

With the above configuration of the present embodiment, noise charge acquisition and distance measurement are performed in the same frame. Accordingly, if an environmental light change occurs in a short time (e.g., in seconds), the noise charges QNS generated due to incident light can be subtracted in real time from the respective charges Q. Thus, the influence of noise charge can be suppressed in response to changes in environmental light, and the accuracy of distance to be measured can be improved.

Third Embodiment

With reference to the drawings, a third embodiment of the present invention will be described.

The third embodiment is configured similarly to the first embodiment shown in FIGS. 1 to 4. The third embodiment will be described below focusing on the operation different from the first embodiment.

FIG. 9 is a diagram illustrating processing of acquiring noise charge integrated in the charge storage units CS according to the present embodiment. In FIG. 9, the integration period corresponds to the period in which charge is integrated in the charge storage units CS in a frame, i.e., in which the processing of distributing charge from the photoelectric conversion element PD to the charge storage units CS described above is repeated. The reading period (readout period) is a period in which the charge integrated in the charge storage units CS in a frame is read out, i.e., in which the charges integrated in the individual charge storage units CS of the pixel circuit 321 of the range image sensor 32 are sequentially read out.

As shown in FIG. 9, under the control of the measurement control unit 43, the present embodiment uses two types of frame, i.e., a frame of a first noise charge acquisition mode (first noise charge acquisition frame) and a frame of a second noise charge acquisition mode (second noise charge acquisition frame) as frames of the noise charge acquisition mode. Frames of the ranging charge acquisition mode are the third and the subsequent frames. As in the first embodiment, when capture of a range image is started, the initial or first frame and the second frame may be in the noise charge acquisition mode, or the first and second noise charge acquisition modes may be performed periodically between blocks of multiple time-series frames of the ranging charge acquisition mode.

In the present embodiment, the first noise charge acquisition mode is a mode for acquiring the first noise charge generated due to only ambient light as incident light and integrated in the charge storage units CS.

The second noise charge acquisition mode is a mode for acquiring the second noise charge (corresponding to the noise charge in the first and second embodiments) generated due to ambient light and reflected light RL as incident light and integrated in the charge storage units CS. The third and the subsequent frames are the frames of the ranging charge acquisition mode for acquiring a range image.

FIG. 10 is a conceptual diagram illustrating noise charge in the charge storage units CS corresponding to the reflected light RL in the ranging charge acquisition mode.

FIG. 10 is a timing chart illustrating timing of emission of the light pulses PO, the reflected light RL, integration drive signals TX1, TX2, TX3, TX4, and drive signal RSTD, and generation of noise charges QNSP (QNSP1, QNSP2, QNSP3, QNSP4) in the ranging charge acquisition mode.

The noise charges QNSP refer to the noise charges generated due to the reflected light RL and integrated in the charge storage units CS. Specifically, the noise charge QNSP1 refers to the noise charge generated due to the reflected light RL and integrated in the charge storage unit CS1. The noise charge QNSP2 refers to the noise charge generated due to the reflected light RL and integrated in the charge storage unit CS2. The noise charge QNSP3 refers to the noise charge generated due to the reflected light RL and integrated in the charge storage unit CS3. The noise charge QNSP4 refers to the noise charge generated due to the reflected light RL and integrated in the charge storage unit CS4.

As shown in FIG. 10, in the ranging charge acquisition mode, the integration drive signals TX1, TX2, TX3, TX4 are controlled to be at the H level or L level at predetermined timings, the transfer transistors G1, G2, G3, G4 are switched, and charge is distributed to each of the charge storage units CS1, CS2, CS3, CS4 from the photoelectric conversion element PD in the integration period, i.e., in all the integration cycles in the charge integration period.

In this case, the light pulses PO are emitted at a predetermined time every integration cycle, the drive signal RSTD is at the L level, and the charge discharge transistors GD1, GD2 remain in the off state in the charge distribution period for the charge storage units CS1, CS2, CS3, CS4.

In this case, the noise charges QNSP1, QNSP2, QNSP3, QNSP4 vary depending on the distribution count of each frame of the ranging charge acquisition mode.

Thus, the charge generated in the photoelectric conversion element PD is transferred to the charge storage units CS1, CS2, CS3, CS4 via the respective transfer transistors G1, G2, G3, G4 for integration therein, being mixed with the noise charge generated due to the reflected light RL and the noise charge generated due to ambient light.

The noise charges QNSP1, QNSP2, QNSP3, QNSP4 generated due to the reflected light RL are required to be acquired every time the distribution count is changed due to an auto exposure function, such as when an image of an object having a greatly different reflectance is captured.

Thus, since the occurrence of changes in distribution count due to auto exposure cannot be predicted, frames of the noise charge acquisition mode are required to be frequently executed.

However, if the processing of frames of the noise charge acquisition mode is frequently performed, range image resolution on the time axis may be reduced. Therefore, in the present embodiment, the following method is used as a measure against the changes in distribution count due to auto exposure.

In the first frame of the first noise charge acquisition mode of FIG. 9, the processing of the noise charge acquisition mode is performed in the integration period as in the first embodiment.

However, in the first noise charge acquisition mode, unlike in the noise charge acquisition mode of the first embodiment, the measurement control unit 43 does not cause the light source unit 2 to emit the light pulses PO, but uses only ambient light as incident light and acquires the noise charges QNSN generated due to the ambient light and integrated in the charge storage units CS. Specifically, the distance calculation unit 42 acquires the noise charges QNSN1, QNSN2, QNSN3, QNSN4 in the respective charge storage units CS1, CS2, CS3, CS4 from the range image sensor 32.

Then, the distance calculation unit 42 stores the acquired noise charges QNSN1, QNSN2, QNSN3, QNSN4 in the storage as noise charges (first noise charges) acquired in the first noise charge acquisition mode.

In the second noise charge acquisition mode, as in the noise charge acquisition mode of the first embodiment, the measurement control unit 43 causes the light source unit 2 to emit the light pulses PO, and uses ambient light and the reflected light RL as incident light and acquires the noise charges QNS generated due to the ambient light and the reflected light RL and integrated in the charge storage units CS. Specifically, the distance calculation unit 42 acquires the noise charges QNS1, QNS2, QNS3, QNS4 in the respective charge storage units CS1, CS2, CS3, CS4 from the range image sensor 32.

Then, the distance calculation unit 42 stores the acquired noise charges QNS1, QNS2, QNS3, QNS4 in the storage as noise charges (second noise charges) acquired in the second noise charge acquisition mode.

The distance calculation unit 42 subtracts the first noise charges (third charges) QNSN1, QNSN2, QNSN3, QNSN4 from the respective second noise charges QNS1, QNS2, QNS3, QNS4 to calculate third noise charges (fourth charges) QNSP1 (=QNS1−QNSN1), QNSP2 (=QNS2−QNSN2), QNSP3 (=QNS3−QNSN4), QNSP4 (=QNS4−QNSN4).

The third noise charges QNSP1, QNSP2, QNSP3, QNSP4 in the respective charge storage units CS1, CS2, CS3, CS4 are noise charges generated due to only the light pulses PO. In this case, the third noise charges QNSP1, QNSP2, QNSP3, QNSP4 correspond to the noise charge generated due to the reflected light RL according to the distribution count in the second noise charge acquisition mode, i.e., according to the emission count that is the number of times of emission of the light pulses PO from the light source unit 2.

Thus, the distance calculation unit 42 stores the calculated third noise charges QNSP1, QNSP2, QNSP3, QNSP4 in the storage.

In the ranging charge acquisition mode of the third and the subsequent frames, as in the frames of the ranging charge acquisition mode of the first embodiment, the measurement control unit 43 causes the light source unit 2 to emit the light pulses PO, and uses ambient light and the reflected light RL as incident light and acquires the charges Q (including the noise charges) generated in the photoelectric conversion element PD due to the ambient light and the reflected light RL and distributed to the charge storage units CS for integration therein. Specifically, the distance calculation unit 42 acquires the charges Q1, Q2, Q3, Q4 from the range image sensor 32, which are generated in the photoelectric conversion element PD and distributed to the respective charge storage units CS1, CS2, CS3, CS4 for integration therein.

Then, as in the first embodiment, the distance calculation unit 42 subtracts the noise charges from the respective acquired charges Q1, Q2, Q3, Q4 to calculate corrected charges QC1, QC2, QC3, QC4.

When calculating the corrected charges QC1, QC2, QC3, QC4 in the present embodiment, the third noise charges QNSP1, QNSP2, QNSP3, QNSP4 are adjusted based on the distribution count in the integration period in the frames of the ranging charge acquisition mode.

Specifically, if the range imaging device has an auto exposure function, the measurement control unit 43 changes the distribution count in the integration period according to the intensity of the reflected light RL so that none of the charge storage units CS becomes saturated.

Thus, the third noise charges QNSP1, QNSP2, QNSP3, QNSP4 are sequentially changed according to the distribution count (emission count of the light pulses).

When calculating a distance in the frames of the ranging charge acquisition mode, the distance calculation unit 42 reads the third noise charges QNSP1, QNSP2, QNSP3, QNSP4 calculated in advance and stored in the storage.

Then, the distance calculation unit 42 divides the distribution count in the frames of the ranging charge acquisition mode subjected to distance calculation, by the distribution count in the second frame of the second noise charge acquisition mode to calculate an adjustment factor k.

The distance calculation unit 42 multiplies each of the third noise charges QNSP1, QNSP2, QNSP3, QNSP4 by the calculated adjustment factor k to calculate adjusted third noise charges (fifth charges) kQNSP1, kQNSP2, kQNSP3, kQNSP4.

Then, the distance calculation unit 42 adds the adjusted third noise charges kQNSP1, kQNSP2, kQNSP3, kQNSP4 to the respective first noise charges QNSN1, QNSN2, QNSN3, QNSN4 to calculate fourth noise charges (fourth charges) QN1 (=QNSN1+kQNSP1), QN2 (=QNSN2+kQNSP2), QN3 (=QNSN3+kQNSP3), QN4 (=QNSN4+kQNSP4).

The distance calculation unit 42 subtracts the fourth noise charges QN1, QN2, QN3, QN4 from the respective charges Q1, Q2, Q3, Q4 to calculate corrected charges QC1, QC2, QC3, QC4.

Then, as in the first embodiment, the distance calculation unit 42 calculates a delay time Td used for calculating the distance between the object S and the range image sensor 32 through Formula (1A) or (2A) using the corrected charges QC1, QC2, QC3, QC4.

With the above configuration, according to the present embodiment, noise charges, i.e., the first noise charges QNSN and the third noise charges QNSP, which are generated due to incident light in the charge storage units CS (CS1, CS2, CS3, CS4) and in the circuit components in the vicinities thereof and integrated in the charge storage units CS, are calculated in advance in the frames of the first and second noise charge acquisition modes, the adjusted third noise charges kQNSP are calculated for the frames of the ranging charge acquisition mode using the adjustment factor k corresponding to the distribution count of these frames, the first noise charges QNSN are added to the respective adjusted third noise charges kQNSP, and the fourth noise charges QN resulting from the addition are subtracted from the respective charges Q to calculate the corrected charges QC1, QC2, QC3, QC4 for adjustment time calculation. Thus, a delay time Td can be obtained using the corrected charges QC1, QC2, QC3, QC4 which are based on the fourth noise charges QN corresponding to the distribution count according to the auto exposure function. Accordingly, the distance between the object S and the range image sensor 32 can be calculated with high accuracy.

Also, according to the present embodiment, the first noise charges QNSN and the third noise charges QNSP are calculated in the first and second frames of the first and second noise charge acquisition modes. Therefore, noise charges corresponding to the distribution count of each frame can be obtained. Thus, as in the second embodiment, processing for calculating noise charges is not required to be performed for each frame, and the noise charges corresponding to the distribution count of each frame can be calculated, easily improving distance measurement accuracy.

Figure 11:
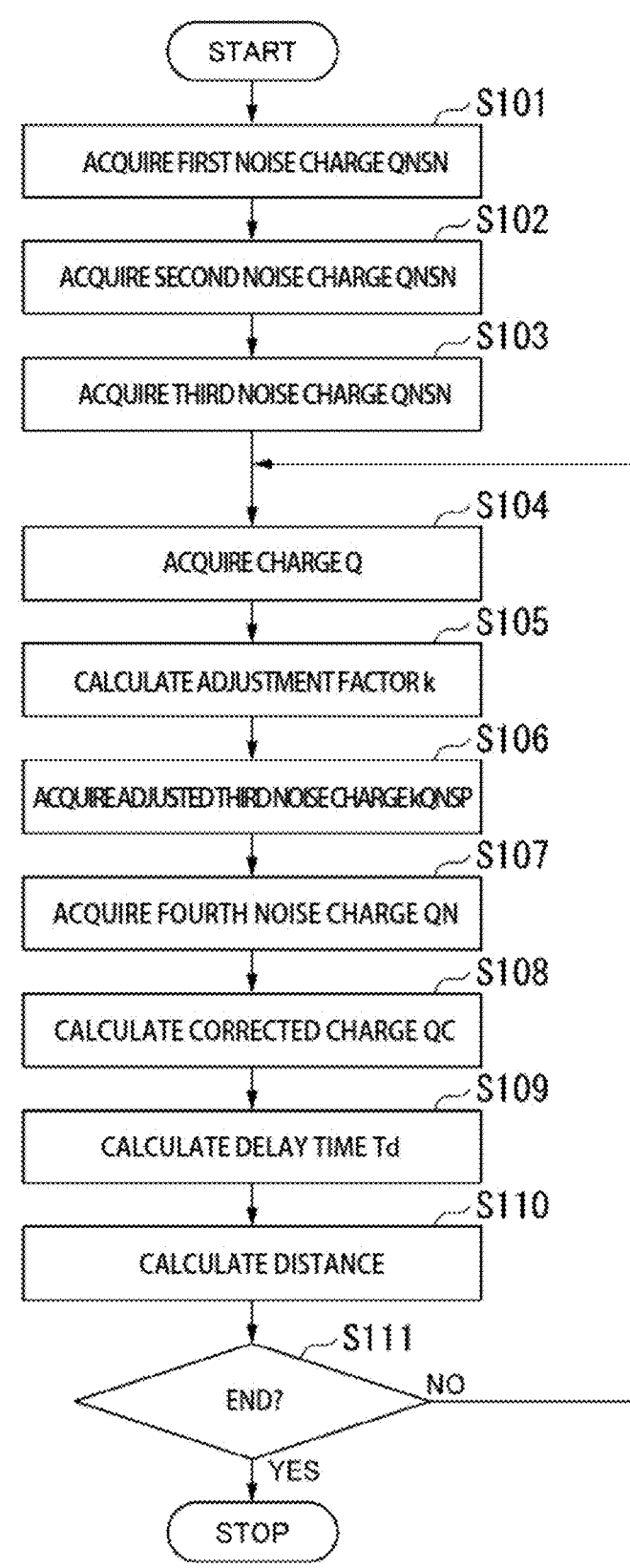
FIG. 11 is a flowchart illustrating an example of processing of calculating a distance between a range image sensor and an object performed by a range imaging device according to the third embodiment of the present invention.

FIG. 11 is a flowchart illustrating an example of processing for calculating a distance between the range image sensor 32 and the object S performed by the range imaging device 1 according to the third embodiment. In each of the pixel circuits 321 of the range image sensor 32, the distance from the pixel circuit 321 (i.e., the range image sensor 32) to the object S is calculated as described below.

Step S101

When distance measurement is started by the range imaging device 1, the measurement control unit 43 outputs an instruction to the timing control unit 41 so that the processing of the first noise charge acquisition mode is performed.

In the first frame, the timing control unit 41 outputs integration drive signals TX1, TX2, TX3, TX4 and a drive signal RSTD to the range image sensor 32 to acquire noise charges QNSN generated due to only ambient light.

Thus, the range image sensor 32 outputs first noise charges QNSN (QNSN1, QNSN2, QNSN3, QNSN4) acquired in the first frame to the distance calculation unit 42.

Step S102

After completing the first frame, the measurement control unit 43 outputs an instruction to the timing control unit 41 so that processing of the second noise charge acquisition mode is performed.

In the second frame, the timing control unit 41 causes the light source unit 2 to emit light pulses PO, and outputs integration drive signals TX1, TX2, TX3, TX4 and a drive signal RSTD to the range image sensor 32 to acquire noise charges QNS (QNS1, QNS2, QNS3, QNS4) generated due to ambient light and the reflected light RL.

Thus, the range image sensor 32 outputs second noise charges QNS acquired in the second frame to the distance calculation unit 42.

Step S103

The distance calculation unit 42 subtracts the first noise charges QNSN from the respective second noise charges QNS to calculate third noise charges QNSP (QNSP1, QNSP2, QNSP3, QNSP4).

The distance calculation unit 42 stores the third noise charges QNSP in the storage together with the first noise charges QNSN, for the charge storage units CS (CS1, CS2, CS3, CS4) of each of the pixel circuits 321.

Step S104

After completing the second frame, the measurement control unit 43 outputs an instruction to the timing control unit 41 so that the processing of the ranging charge acquisition mode is performed.

In the third frames (i.e., the third and the subsequent frames), the timing control unit 41 causes the light source unit 2 to emit light pulses PO, and outputs integration drive signals TX1, TX2, TX3, TX4 and a drive signal RSTD to the range image sensor 32 for control of charge distribution from the photoelectric conversion element PD to the individual charge storage units CS so that the distance between the object S and the range image sensor 32 can be measured.

Thus, the range image sensor 32 outputs the charges Q (Q1, Q2, Q3, Q4) acquired in the third frames to the distance calculation unit 42.

Step S105

The distance calculation unit 42 divides the distribution count of the third frames targeted for ranging by the distribution count of the second frame to calculate an adjustment factor k.

Step S106

The distance calculation unit 42 reads the third noise charges QNSP from the storage and multiplies each of these charges QNSP by the adjustment factor k to calculate adjusted third noise charges kQNSP (kQNSP1, kQNSP2, kQNSP3, kQNSP4).

Step S107

The distance calculation unit 42 reads the first noise charges QNSN from the storage and adds the read first noise charges QNSN to the respective adjusted third noise charges kQNSP to calculate fourth noise charges QN (QN1, QN2, QN3, QN4).

Step S108

The distance calculation unit 42 subtracts the calculated fourth noise charges QN from the respective charges Q to calculate corrected charges QC (QC1, QC2, QC3, QC4).

Step S109

Using the calculated corrected charges QC, the distance calculation unit 42 calculates a delay time Td through Formula (1A) or (2A).

Step S110

The distance calculation unit 42 multiplies the calculated delay time Td by the speed of light and divides the product into half (½) to calculate the distance from the range image sensor 32 to the object S.

Step S111

The measurement control unit 43 determines whether a control signal for terminating ranging has been received.

In this case, if the control signal for terminating ranging has been received, the measurement control unit 43 terminates the processing; however, if not, it allows processing to return to step S104.

With reference to the drawings, a fourth embodiment of the present invention will be described. The basic configuration is similar to that of the first embodiment. Therefore, like reference signs are used for like components to omit description, and only differences will be described.

Figure 12:
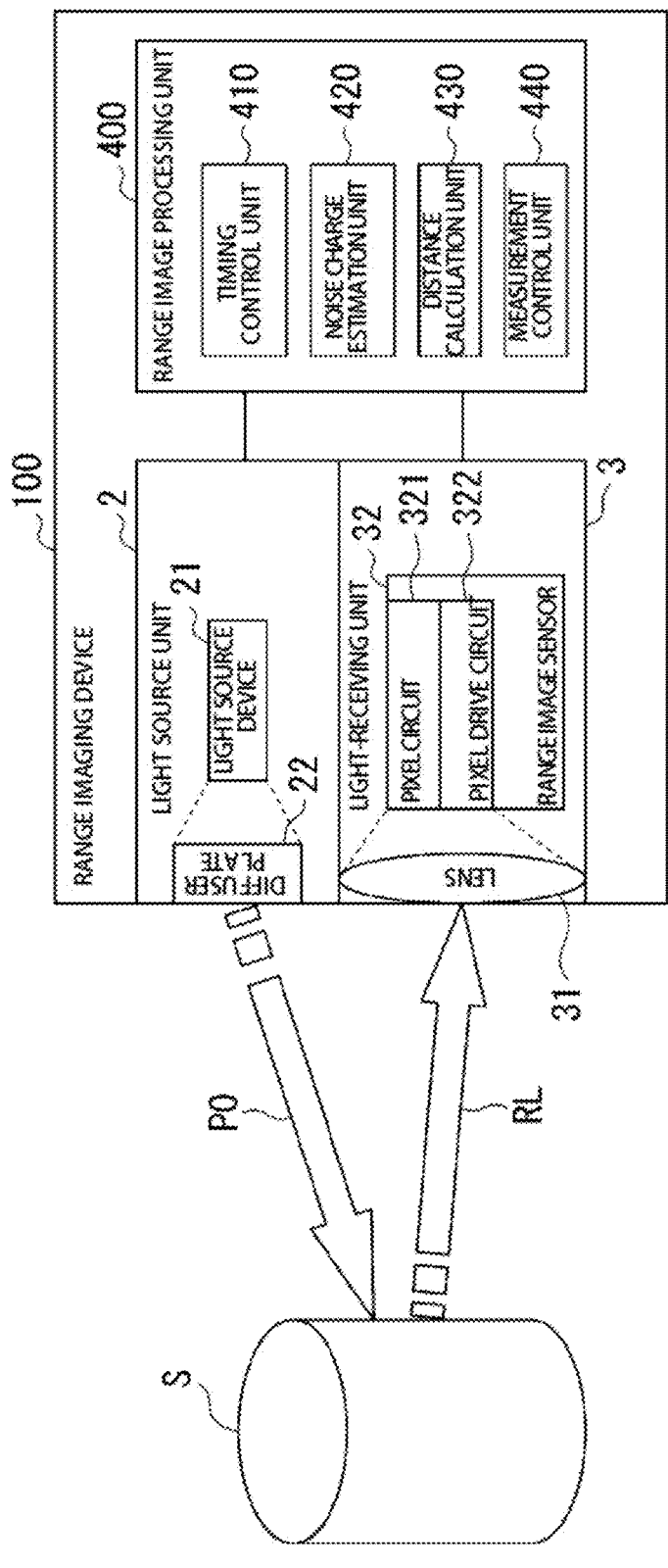
FIG. 12 is a schematic block diagram illustrating a configuration of a range imaging device according to a fourth embodiment of the present invention.

FIG. 12 is a schematic block diagram illustrating a configuration of a range imaging device according to the fourth embodiment of the present invention. A range imaging device 100 configured as shown in FIG. 12 includes a light source unit 2, a light-receiving unit 3, and a range image processing unit 400. FIG. 12 also shows an object S whose distance is to be measured by the range imaging device 100. A range imaging element may be, for example, a range image sensor 32 (described later) in the light-receiving unit 3.

The light source unit 2 emits light pulses PO into a space as an imaging target where the object S is present whose distance is to be measured by the range imaging device 100 under the control of the range image processing unit 400. The light source unit 2 may be, for example, a surface-emitting semiconductor laser module such as a vertical-cavity surface-emitting laser (VCSEL). The light source unit 2 includes a light source device 21 and a diffuser plate 22.

The light source device 21 is a light source that emits laser light in the near infrared wavelength band (e.g., wavelength band of 850 nm to 940 nm) which serves as the light pulses PO to be emitted to the object S. The light source device 21 may be, for example, a semiconductor laser light emitting device. The light source device 21 emits pulsed laser light under the control of a timing control unit 410.

The diffuser plate 22 is an optical component that diffuses laser light in the near infrared wavelength band emitted from the light source device 21 over the emission surface area of the object S. Pulsed laser light diffused by the diffuser plate 22 is emitted as the light pulses PO and applied to the object S.

The light-receiving unit 3 receives reflected light RL arising from reflection of the light pulses PO from the object S, which is an object whose distance is to be measured by the range imaging device 100, and outputs a pixel signal according to the received reflected light RL. The light-receiving unit 3 includes a lens 31 and a range image sensor 32.

The lens 31 is an optical lens that guides the incident reflected light RL to the range image sensor 32. The lens 31 outputs the incident reflected light RL toward the range image sensor 32, so that the light can be received by (be incident on) pixel circuits provided to the light-receiving region of the range image sensor 32.

The range image sensor 32 is an imaging device used for the range imaging device 100. The range image sensor 32 includes multiple pixel circuits 321 disposed in a two-dimensional light-receiving region, and a pixel drive circuit 322 that controls the pixel circuits 321.

The pixel circuits 321 each include one photoelectric conversion element (e.g., photoelectric conversion element PD described later), multiple charge storage units (e.g., charge storage units CS1 to CS4 described later) corresponding to this photoelectric conversion element, and components that distribute charge to the individual charge storage units.

The range image sensor 32 distributes charge, which has been generated by the photoelectric conversion element under the control of the timing control unit 410, to the charge storage units. Also, the range image sensor 32 outputs pixel signals according to the charge distributed to the charge storage units. The range image sensor 32, in which multiple pixel circuits are formed in a two-dimensional matrix, outputs single-frame pixel signals corresponding to the respective pixel circuits.

The range image processing unit 400 controls the range imaging device 100 and calculates the distance to the object S.

The range image processing unit 400 includes the timing control unit 410, a noise charge estimation unit 420, a distance calculation unit 430, and a measurement control unit 440.

The timing control unit 410 controls timing of outputting several control signals required for measuring a distance, under the control of the measurement control unit 440. The various control signals refer to, for example, a signal for controlling emission of the light pulses PO, a signal for distributing the reflected light RL to the charge storage units, a signal for controlling the distribution count per frame, and other signals. The distribution count refers to the number of times of repetition of the processing for distributing charge to the charge storage units CS (see FIG. 16).

The noise charge estimation unit 420 estimates an adjustment noise charge (adjustment noise charge QFP described later) from ambient light charge as integrated noise charge in order to correct the integrated charge (first charge) Q integrated in the charge storage units CS, using a noise charge flow ratio α which indicates a ratio between ambient light charge (ambient light charge QB described later) that is generated due to ambient light in the measurement space and distributed from the photoelectric conversion element PD to the charge storage units CS for integration therein via the transfer transistors G, and noise charge that is generated due to ambient light and flows into the charge storage units CS for integration therein without passing through the transfer transistors G. The integrated charge Q integrated in the charge storage units CS includes ambient light charge and noise charge.

Under the control of the measurement control unit 440, the distance calculation unit 430 outputs distance information indicating the distance to the object S calculated based on corrected charge BC which is obtained by subtracting the adjustment noise charge from a pixel signal (voltage corresponding to the integrated charge Q described later) output from the range image sensor 32. The distance calculation unit 430 calculates a delay time Td from when the light pulses PO are emitted until when the reflected light RL is received, based on the charge integrated in the charge storage units CS. The distance calculation unit 430 calculates the distance from the range imaging device 100 to the object S according to the calculated delay time Td.

The measurement control unit 440 selects mode between a noise charge inflow ratio acquisition mode and a ranging charge acquisition mode as normal frames for ranging.

The noise charge inflow ratio acquisition mode is a mode for executing a ratio acquisition frame that is a frame for acquiring a noise charge inflow ratio α which is used for estimating a noise charge, in the modes of frames repeated at a frame cycle.

The measurement control unit 440 controls timing for the timing control unit 410 and controls calculation for the distance calculation unit 430, according to the noise charge acquisition mode and the ranging charge acquisition mode (described later).

The noise charge refers to charge which is generated in the semiconductor substrate region other than the photoelectric conversion element PD due to incident light (ambient light and reflected light) from the measurement space and integrated in the charge storage units CS.

This noise charge refers to charge other than the charge distributed and integrated by the switching operation of the transfer transistors G, i.e., charge flowing into the charge storage units CS for integration therein without passing through the transfer transistors G.

More specifically, the range imaging device according to the present embodiment calculates the distance between the object and the range image sensor 32 based on the charge integrated in the charge storage units CS. Thus, irrespective of the charge that is read at predetermined timing from the photoelectric conversion element, noise charge due to ambient light or the like is integrated in the charge storage units CS until the time point of the reading performed in each frame, and therefore, the accuracy of the distance calculated in ranging is deteriorated.

The characteristics (on resistance, switching characteristics, etc.) of the transfer transistors G, which distribute charge to the charge storage units CS from the photoelectric conversion element PD, are different between the transfer transistors G.

Therefore, even when constant charge is generated in the photoelectric conversion element PD due to incident light with constant intensity, different amounts of charge may be distributed to the respective charge storage units CS due to the characteristics variation of the transfer transistors G.

In order to suppress variation between the transfer transistors G, a correction factor (adjustment factor) β is determined for each of the charge storage units CS. The correction factor β is determined for each of the transfer transistors G of each pixel circuit 321 to cancel variation between the transfer transistors G.

Herein, a correction factor β1 is determined for the transfer transistor G1, a correction factor β2 is determined for the transfer transistor G2, a correction factor β3 is determined for the transfer transistor G3, and a correction factor p4 is determined for the transfer transistor G4.

For example, in the case where constant charge is generated in the photoelectric conversion element PD due to incident light with constant intensity and the charge is distributed to the charge storage units CS via the transfer transistors G, the charges read from the respective charge storage units CS are multiplied by the respective correction factors R so that the integrated charges Q can be adjusted to charges equivalent to each other (adjusted corrected charges).

Accordingly, the distance calculation unit 430 can calculate the distance between the object S and the range imaging device 100 with high accuracy by multiplying the integrated charges Q read from the respective charge storage units CS by the respective correction factors 3.

However, as described in the section [Technical Problem], the noise charges GF flowing into the individual charge storage units CS for integration therein are equivalent between the charge storage units CS of each pixel circuit 321.

The integrated charge Q read from each charge storage unit CS includes not only charge QC (referred to as controlled charge QC hereinafter) which has been distributed from the photoelectric conversion element PD via the corresponding transfer transistor G, but also noise charge QF that has flowed into the charge storage unit CS for integration therein without passing through the transfer transistor G.

Accordingly, if the distance calculation unit 430 multiplies the integrated charge Q read from the charge storage unit CS by the correction factor β, not only the controlled charge QC but also the noise charge GF included in the integrated charge Q may be corrected.

Due to the correction using the correction factors 3, the noise charges QF included in the respective integrated charges Q may vary according to the characteristics variation between the transfer transistors G, and therefore, the distance between the object S and the range imaging device 100 cannot be calculated with high accuracy.

Figures 13A, 13B, 14A, 14B:
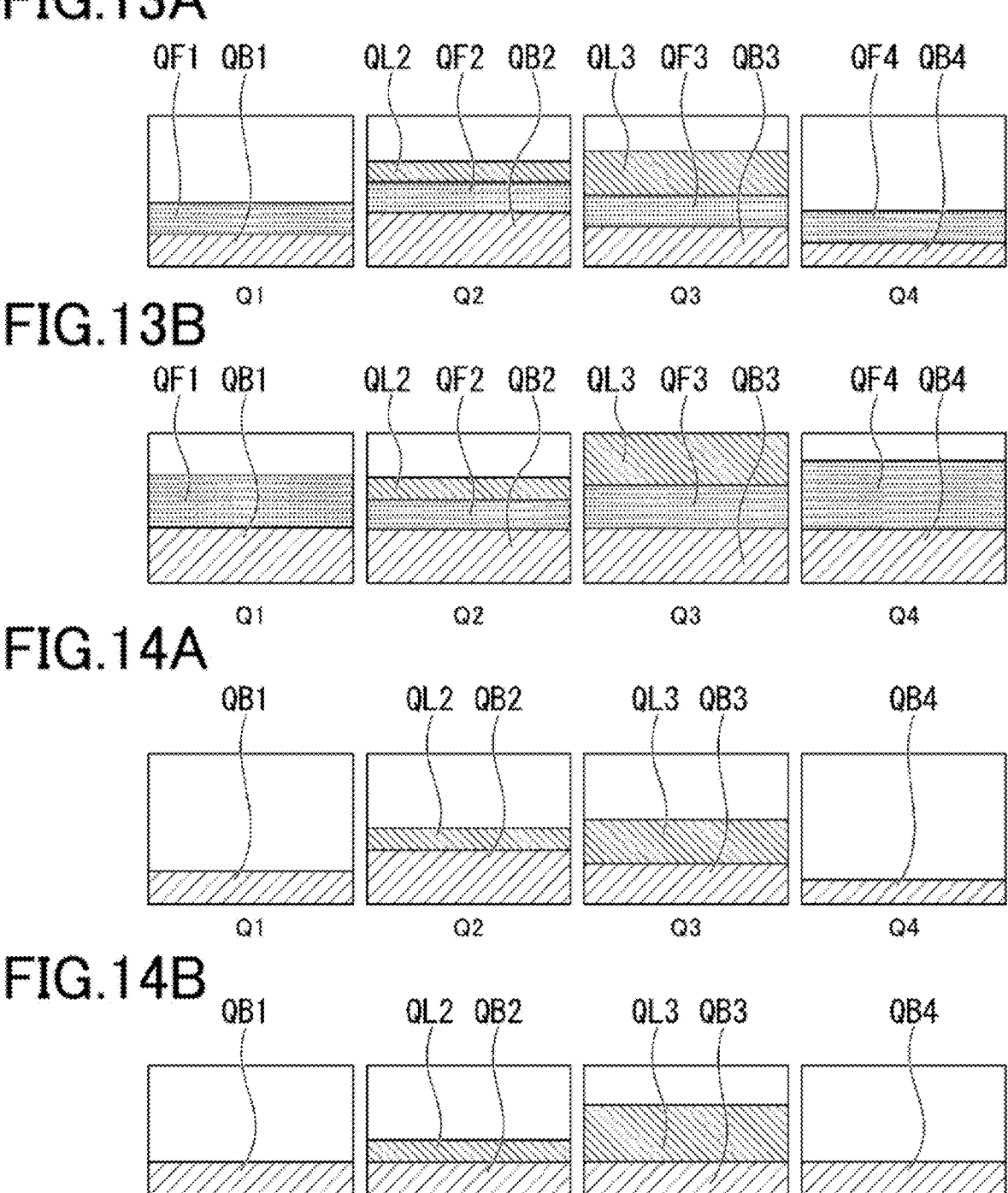
FIG. 13A is a diagram illustrating integrated charges in individual charge storage units.
FIG. 13B is a diagram illustrating results obtained by multiplying each of integrated charges by correction factor of a corresponding one of transfer transistors.
FIG. 14A is a diagram illustrating results obtained by subtracting adjustment charges from respective integrated charges shown in FIG. 13A.
FIG. 14B is a diagram illustrating integrated charges after correcting variation due to variation in characteristics between transfer transistors by multiplying each of integrated charges by a corresponding one of correction factors.

FIGS. 13A, and 13B are diagrams each illustrating the integrated charges Q integrated in the respective charge storage units CS in the charge integration period of the frame cycle. FIGS. 13A and 13B each show the case where the reflected light RL arising from reflection of the light pulses PO from the object S is integrated in the charge storage units CS2, CS3.

Figure 15:
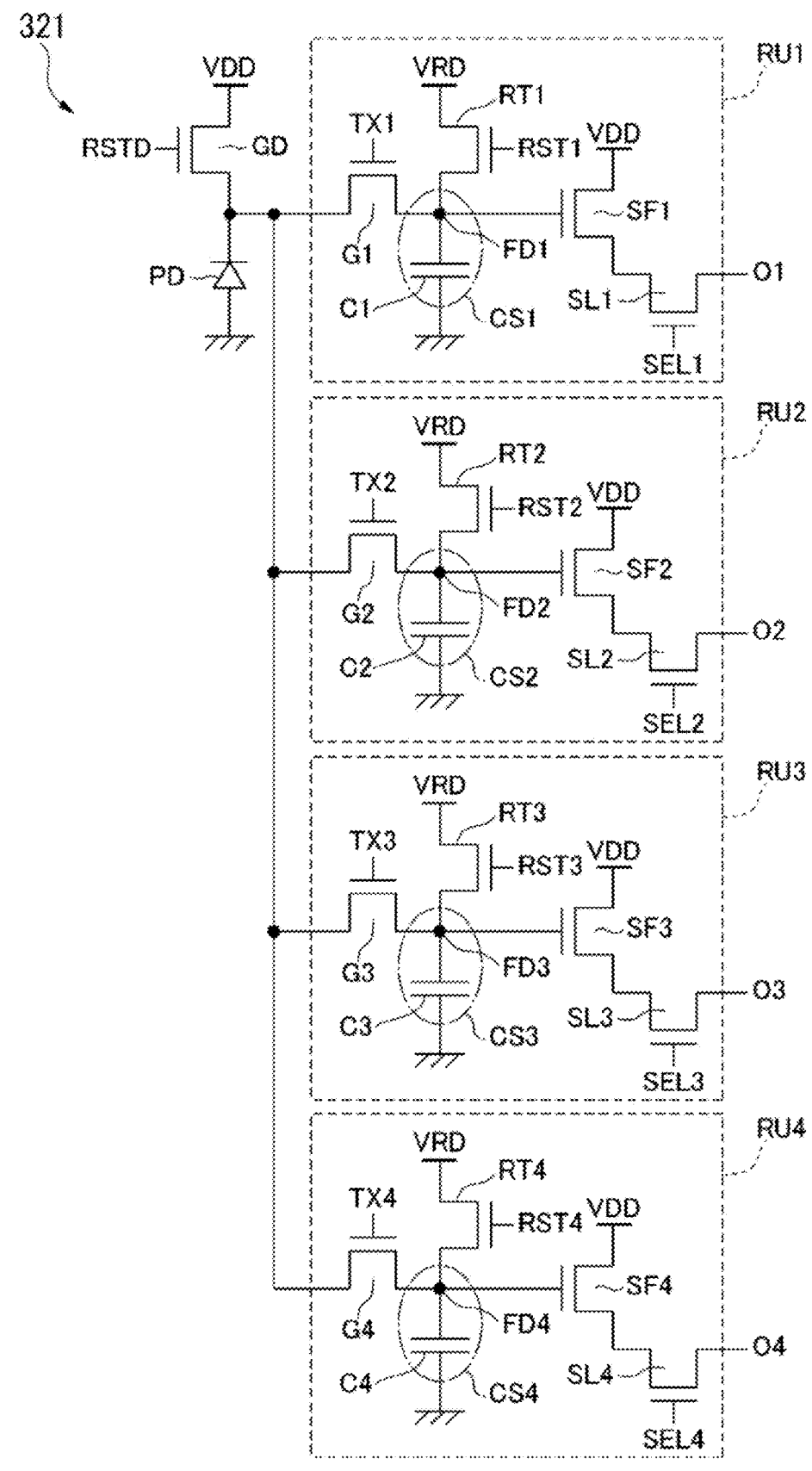
FIG. 15 is a circuit diagram illustrating an example of a configuration of a pixel circuit disposed in a range image sensor in a range imaging device according to the fourth embodiment of the present invention.

FIG. 13A shows the integrated charges Q1, Q2, Q3, Q4 in the respective charge storage units CS1 to CS4 (see FIG. 15).

The integrated charge Q1 includes ambient light charge QB1 and noise charge QF1.

The integrated charge Q2 includes ambient light charge QB2, noise charge QF2, and reflected light charge QL2.

The integrated charge Q3 includes ambient light charge QB3, noise charge QF3, and reflected light charge QL3.

The integrated charge Q4 includes ambient light charge QB4 and noise charge QF4.

The noise charges QF1, QF2, QF3, QF4 are equivalent to each other as described above.

The ambient light charges QB1 to QB4 generated in the photoelectric conversion element PD due to ambient light are equivalent to each other because the intensity of the ambient light is constant and the charge actually generated in the photoelectric conversion element PD is also constant accordingly.

However, the characteristics of the transfer transistors G1, G2, G3, G4 for distributing charge from the photoelectric conversion element PD to the charge storage units CS1, CS2, CS3, CS4 are different between the transfer transistors.

Therefore, as shown in FIG. 13A, the ambient light charges QB1, QB2, QB3, QB4 integrated in the charge storage units CS1, CS2, CS3, CS4 are different therebetween.

However, the noise charges QF1, QF2, QF3, QF4 integrated in the charge storage units CS1, CS2, CS3, CS4 are equivalent to each other.

FIG. 13B is a diagram illustrating the results obtained by multiplying the integrated charges Q1, Q2, Q3, Q4 by the correction factors β of the respective transfer transistors G1, G2, G3, G4.

As can be seen, as a result of the correction performed by multiplying the correction factors β1, β2, β3, β4, the ambient light charges QB1, QB2, QB3, QB4 become equivalent to each other.

However, as can be seen, as a result of the correction performed by multiplying the correction factors β1, β2, β3, β4, the noise charges QF1, QF2, QF3, QF4, which have been equivalent to each other, become different to each other.

FIGS. 14A and 14B are diagrams each illustrating the integrated charges Q after adjustment using adjustment noise charge QFP.

FIG. 14A shows a state after subtraction of the adjustment noise charge QFP (corresponding to the noise charge QF and the noise charge (second charge) of the first to third embodiments) from the integrated charges Q1, Q2, Q3, Q4 shown in FIG. 13A.

Thus, the integrated charges Q1, Q2, Q3, Q4 do not include the noise charges QF1, QF2, QF3, QF4.

Similarly to FIG. 13B, FIG. 14B shows integrated charges Q1B, Q2B, Q3B, Q4B after correcting the characteristics variation of the transfer transistors G1, G2, G3, G4 by multiplying the integrated charges Q1, Q2, Q3, Q4 by the respective correction factors β1, β2, β3, β4.

The variation between the ambient light charges QB1, QB2, QB3, QB4 in the respective integrated charges Q1, Q2, Q3, Q4 of FIG. 14A is eliminated in the integrated charges Q1B, Q2B, Q3B, Q4B of FIG. 14B.

Furthermore, since the noise charges QF1, QF2, QF3, QF4 are removed from the respective integrated charges Q1B, Q2B, Q3B, Q4B to remain controlled charges QC, the distance between the object S and the range imaging device 100 can be calculated with high accuracy.

Specifically, in the case of performing correction for suppressing characteristics variation of the transfer transistors G by multiplying the integrated charges Q by the respective correction factors β determined for the respective charge storage units CS, the noise charges QF are required to be subtracted from the respective integrated charges Q in advance so that only the components of the controlled charges QC remain as the integrated charges Q.

Therefore, in the present embodiment, the distance calculation unit 430 subtracts adjusted noise charges QFP (corresponding to the noise charges QF) estimated by the noise charge estimation unit 420 from the respective integrated charges Q, and multiplies the subtraction results by the respective correction factors R to calculate the distance between the object S and the range imaging device 100 using integrated charges Q' after correction (i.e., the controlled charges QC).

With this configuration, in the range imaging device 100, the light source unit 2 emits the light pulses PO in the near infrared wavelength band toward the object S, the light-receiving unit 3 receives the reflected light RL arising from reflection of the light pulses PO from the object S, and the range image processing unit 400 outputs distance information indicating the distance as measured between the object S and the range imaging device 100.

Although FIG. 12 shows a range imaging device 100 configured to include the range image processing unit 400 inside thereof, the range image processing unit 400 may be a component provided external to the range imaging device 100.

Next, the configuration of a pixel circuit 321 in the range image sensor 32 will be described. FIG. 15 is a circuit diagram illustrating an example of a configuration of a pixel circuit 321 disposed in the range image sensor 32 in the range imaging device according to the fourth embodiment of the present invention. The pixel circuit 321 shown in FIG. 15 is a configuration example including four pixel signal readouts RU1 to RU4.

The pixel circuit 321 includes one photoelectric conversion element PD, a charge discharge transistor GD (GD1 or GD2 described later), and four pixel signal readouts RU (RU1 to RU4) which output voltage signals from respective output terminals O. Each of the pixel signal readouts RU includes a transfer transistor G, floating diffusion FD, charge storage capacitor C, reset transistor RT, source follower transistor SF, and selection transistor SL. The floating diffusion FD and the charge storage capacitor C configure a charge storage unit CS.

In the pixel circuit 321 shown in FIG. 15, the pixel signal readout RU1 which outputs a voltage signal from an output terminal O1 includes a transfer transistor G1 (transfer MOS transistor), floating diffusion FD1, charge storage capacitor C1, reset transistor RT1, source follower transistor SF1, and selection transistor SL1. In the pixel signal readout RU1, the floating diffusion FD1 and the charge storage capacitor C1 configure a charge storage unit CS1. The pixel signal readouts RU2, RU3, RU4 are configured similarly.

The photoelectric conversion element PD is an embedded photodiode which performs photoelectric conversion of incident light, generates charge corresponding to the incident light, and integrates the generated charge. In the present embodiment, incident light is incident from a space targeted for measurement.

In the pixel circuit 321, charge generated by photoelectric conversion of incident light by the photoelectric conversion element PD is distributed to the four charge storage units CS (CS1 to CS4), and voltage signals corresponding to the distributed charge are outputted to the range image processing unit 400.

The configuration of each pixel circuit disposed in the range image sensor 32 is not limited to the configuration, as shown in FIG. 15, provided with the four pixel signal readouts RU (RU1 to RU4), but the pixel circuit may be configured to include one or more pixel signal readouts RU.

In response to each pixel circuit 321 of the range imaging device 100 being driven, the light pulses PO are emitted during an emission period To and reflected light RL is received by the range image sensor 32 after a delay time Td. Under the control of the timing control unit 410, the pixel drive circuit 322 supplies integration drive signals TX1 to TX4 to the transfer transistors G1, G2, G3, G4 according to their respective timings (integration timings) synchronizing with emission of the light pulses PO to distribute charge generated in the photoelectric conversion element PD for sequential integration in the charge storage units CS1, CS2, CS3, CS4.

The pixel drive circuit 322 controls the reset transistors RT and the selection transistors SL using respective drive signals RST and SEL, converts the charge integrated in the charge storage units CS into electrical signals using the source follower transistors SF, and outputs the converted electrical signals to the distance calculation unit 430 via the terminals O.

Under the control of the timing control unit 410, the pixel drive circuit 322 passes and discharges the charge generated in the photoelectric conversion element PD to power sources VDD using a drive signal RSTD (eliminates the charge).

Figure 16:
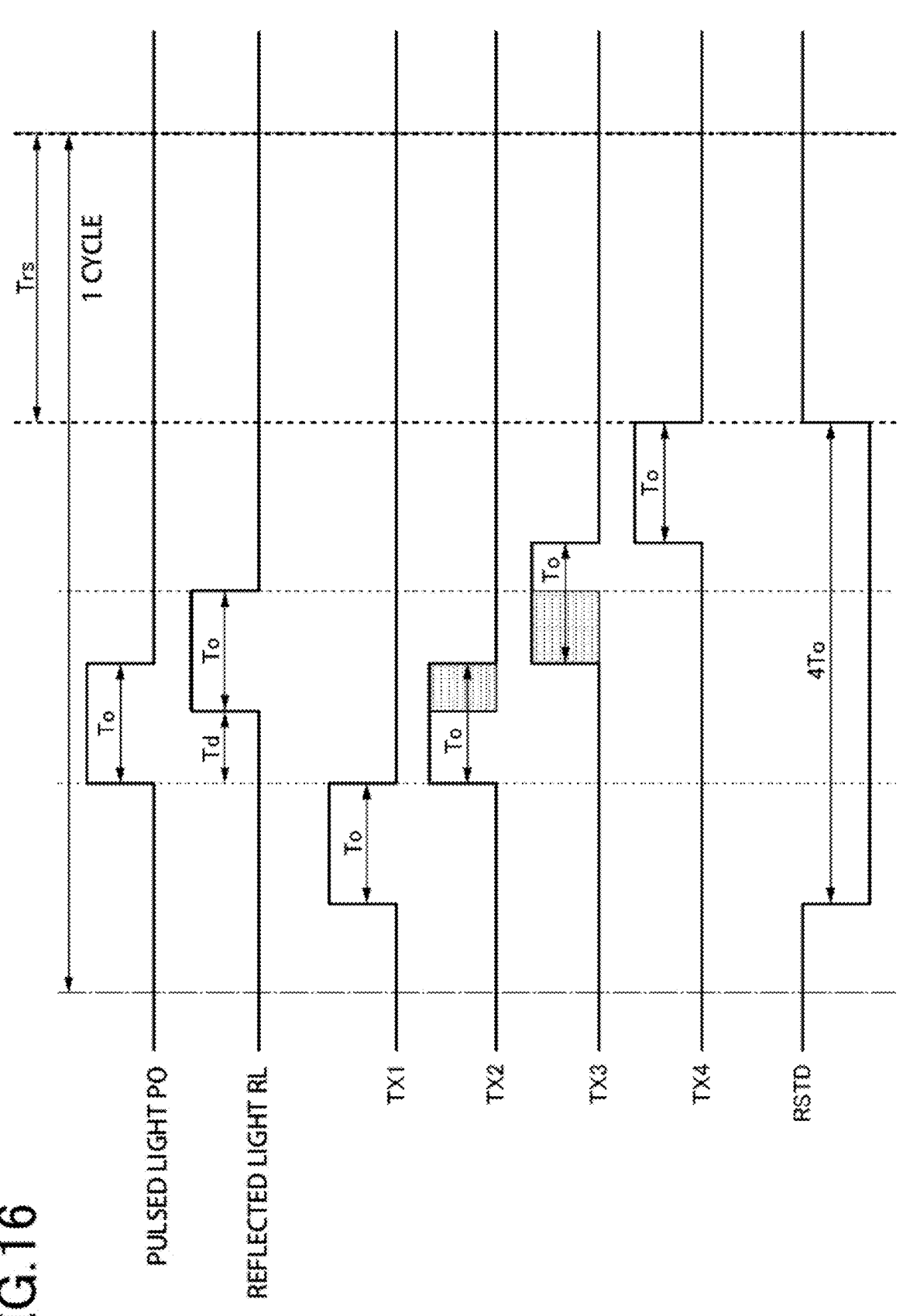
FIG. 16 is a timing chart illustrating transfer of electrical charge generated in a photoelectric conversion element to individual charge storage units.

FIG. 16 is a timing chart illustrating transfer of charge generated in the photoelectric conversion element PD to the individual charge storage units CS.

In the timing chart of FIG. 16, the vertical axis indicates pulse level and the horizontal axis indicates time. The timing chart shows a correlation between the light pulses PO and the reflected light RL on the time axis, timing of integration drive signals TX1 to TX4 supplied to the respective transfer transistors G1 to G4, and timing of the drive signal RSTD supplied to the charge discharge transistor GD.

The timing control unit 410 causes the light source unit 2 to emit the light pulses PO into the measurement space. Thus, the light pulses PO are reflected by the object and received by the light-receiving unit 3 as the reflected light RL. Also, the photoelectric conversion element PD generates charge corresponding to ambient light and the reflected light RL. The pixel drive circuit 322, which transfers charge generated in the photoelectric conversion element PD to the charge storage units CS1 to CS4, performs switching control for the transfer transistors G1 to G4.

In other words, the pixel drive circuit 322 supplies the integration drive signals TX1 to TX4 to the transfer transistors G1 to G4 as H-level signals with a predetermined duration (the same duration as the emission period To).

For example, the pixel drive circuit 322 turns on the transfer transistor G1 provided on the transfer path through which charge is transferred to the charge storage unit CS1 from the photoelectric conversion element PD. Thus, the charge photoelectrically converted by the photoelectric conversion element PD is integrated in the charge storage unit CS1 via the transfer transistor G1. After that, the pixel drive circuit 322 turns off the transfer transistor G1. Thus, charge transfer to the charge storage unit CS1 is stopped. In this way, the pixel drive circuit 322 causes the charge storage unit CS1 to integrate charge. The same applies to other charge storage units CS2, CS3, CS4.

In this case, in a charge integration period in which charge is distributed to the charge storage units CS (period in which charge is integrated in the charge storage units CS in a frame), the integration cycle is repeated so that the integration drive signals TX1, TX2, TX3, TX4 are supplied to the transfer transistors G1, G2, G3, G4.

Thus, charge corresponding to the incident light is transferred to the charge storage units CS1, CS2, CS3, CS4 from the photoelectric conversion element PD via the transfer transistors G1, G2, G3, G4. The integration cycle is repeated multiple times in the charge integration period.

Thus, charge is integrated in the charge storage units CS1, CS2, CS3, CS4 every integration cycle of each of the charge storage units CS1, CS2, CS3, CS4 during the charge integration period.

When repeating the integration cycle for each of the charge storage units CS1, CS2, CS3, CS4, after completing charge transfer (distribution) to the charge storage unit CS4, the pixel drive circuit 322 turns on the charge discharge transistor GD provided on the discharge path through which charge is discharged from the photoelectric conversion element PD, by supplying an H-level drive signal RSTD.

Thus, the charge discharge transistor GD discards the charge generated in the photoelectric conversion element PD before restarting the integration cycle for the charge storage unit CS1 and after completing the previous integration cycle for the charge storage unit CS4 (i.e., the photoelectric conversion element PD is reset). In other words, the charge discharge transistor GD, or at least one discharge transistor GD, discharges the charge from the photoelectric conversion element PD, discharging it in a period other than the period when the charge generated in the photoelectric conversion element PD due to incident light is distributed to and integrated in the individual chare storage units CS1, CS2, CS3, CS4.

The pixel drive circuit 322 sequentially performs signal processing such as A/D conversion processing for the voltage signals from all the pixel circuits 321 disposed in the light-receiving unit 3 for each row (horizontal array) of the pixel circuits 321.

After that, the pixel drive circuit 322 sequentially outputs the voltage signals subjected to signal processing to the distance calculation unit 430, in the order of columns of the pixel circuits disposed in the light-receiving unit 3.

As described above, the pixel drive circuit 322 repeatedly integrates charge in the charge storage units CS and discards charge photoelectrically converted by the photoelectric conversion element PD in a single frame. Thus, charge corresponding to the intensity of light received by the range imaging device 100 in a predetermined time interval is integrated in the individual charge storage units CS. The pixel drive circuit 322 outputs electrical signals corresponding to single-frame charges integrated in the charge storage units CS to the distance calculation unit 430.

Due to the relationship between the timing at which the light pulses PO are emitted and the timing at which charge is stored in each of the charge storage units CS (CS1 to CS4), the charge corresponding to an external light component such as the ambient light component before emission of the light pulses PO is held in the charge storage CS1. Also, charge corresponding to the reflected light RL and the external light component are distributed to and held in the charge storage units CS2, CS3, CS4. Distribution of charge to the charge storage units CS2, CS3 or the charge storage units CS3, CS4 (distribution ratio) can be a ratio according to the delay time Td (FIG. 16) from when the light pulses PO are reflected by the object S until when the reflected light is incident on the range imaging device 100.

Referring back to FIG. 12, the distance calculation unit 430 calculates a delay time Td using this principle through the following Formula (3) or Formula (4).

$$Td=To \times (Q3B-Q1B)/(Q2B+Q3B-2 \times Q1B) \qquad (3)$$

$$Td=To+To \times (Q4B-Q1B)/(Q3B+Q4B-2 \times Q1B) \qquad (4)$$

In these formulas, To represents a period of time during which the light pulses PO are emitted. Q1B represents integrated charge calculated by subtracting the adjustment noise charge QFP from the charge Q1 integrated in the charge storage unit CS1, and multiplying the subtraction result by a correction factor $\beta 1$. Q2B represents integrated charge calculated by subtracting the adjustment noise charge QFP from the charge Q2 integrated in the charge storage unit CS2, and multiplying the subtraction result by a correction factor $\beta 2$.

Q3B represents integrated charge calculated by subtracting the adjustment noise charge QFP from the charge Q3 integrated in the charge storage unit CS3, and multiplying the subtraction result by a correction factor $\beta 3$. Q4B represents integrated charge calculated by subtracting the adjustment noise charge QFP from the charge Q4 integrated in the charge storage unit CS4, and multiplying the subtraction result by a correction factor $\beta 4$.

For example, if Q4B=Q1B, the distance calculation unit 430 calculates a delay time Td using Formula (3) and, if Q2B=Q1B, calculates a delay time Td using Formula (4).

In Formula (3), charge generated due to reflected light is integrated in the charge storage units CS2, CS3, but is not integrated in the charge storage unit CS4. In Formula (4), charge generated due to reflected light is integrated in the charge storage units CS3, CS4, but is not integrated in the charge storage unit CS2.

In Formula (3) or (4), of the charges integrated in the charge storage units CS2, CS3, CS4, the component corresponding to the external light component is assumed to be the same in amount as the charge integrated in the charge storage unit CS1.

The distance calculation unit 430 multiplies the delay time calculated through Formula (3) or (4) by the speed of light (velocity) to calculate a round-trip distance to the object S.

Then, the distance calculation unit 430 calculates ½ of the round-trip distance calculated above (delay time Tdxc (light velocity)/2) to calculate the distance to the object S from the range image sensor 32 (i.e., the range imaging device 100).

Figure 17:
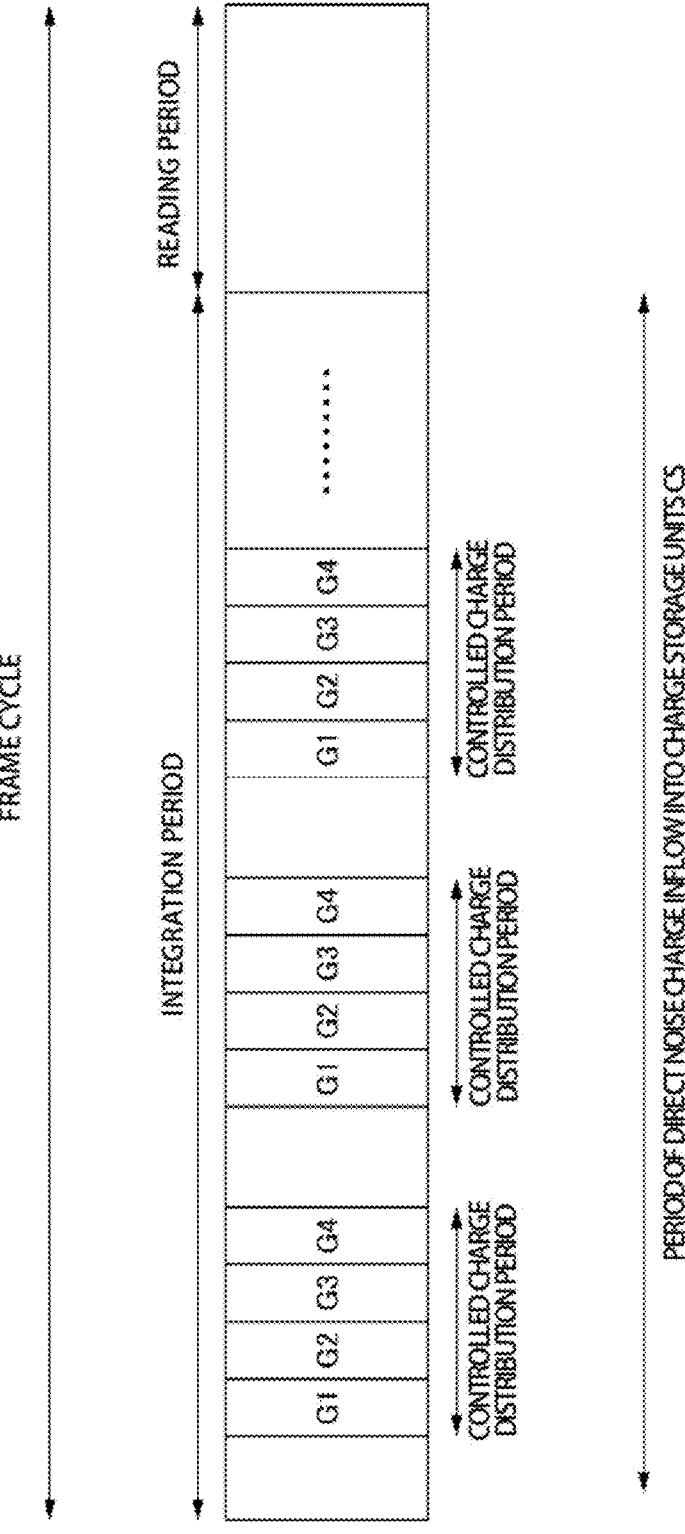
FIG. 17 is a conceptual diagram illustrating a time relationship in which controlled charge and noise charge are integrated in charge storage units.

FIG. 17 is a conceptual diagram illustrating a time relationship in which controlled charge and noise charge are integrated in the charge storage units CS.

As shown in FIG. 17, a frame cycle is composed of an integration period and a reading period.

Thus, integrated charge Q is integrated in each of the charge storage units CS in the integration period of each frame.

In the reading period, integrated charge is outputted to the range image processing unit 400 from each of the charge storage units CS of each of the pixel circuits 321, and the range image processing unit 400 calculates the distance between the object S and the pixel.

The period in which the charge generated in the photoelectric conversion element PD is distributed to the charge storage units CS via the transfer transistors G as controlled charge (the charge generated due to the reflected light RL and the charge generated due to ambient light) corresponds to the pulse width of the integration drive signals TX which turn on the transfer transistors G.

Distribution performed by the photoelectric conversion element PD for the charge storage units CS is performed a predetermined number of times (distribution count) in the integration period of each frame.

Noise charge, which is generated in the semiconductor substrate due to incident light and flows into the charge storage units CS without passing through the transfer transistors G, is integrated in the individual charge storage units CS of each pixel circuit 321 before being read as integrated charges Q, i.e., the noise charge continuously flows into the charge storage units CS for integration therein during the integration period.

Since the period in which the incident light does not include the reflected light RL is longer than the period including the reflected light RL, and since the intensity of incident ambient light is the same between the photoelectric conversion element PD and the semiconductor substrate, there is a correlation between the reflected light charges QL and the noise charges QF.

Therefore, in the present embodiment, a noise charge inflow ratio $\alpha$ used for estimating an adjustment noise charge QFP is calculated in advance from the reflected light charges QL and the noise charges QF.

By multiplying the pulse width of the integration drive signals TX used for the transfer transistors G by the distribution count, a duration TALL during which the charge generated in the photoelectric conversion element PD is supplied to the individual charge storage units CS can be calculated. The duration TALL corresponds to the period of time in which the photoelectric conversion element PD generates charge to be supplied to the individual charge storage units CS.

Accordingly, by dividing the ambient light charges QB by the duration TALL, charge generated in unit time in the photoelectric conversion element PD can be calculated.

Thus, a noise charge inflow ratio α can be calculated by dividing the noise charge integrated in the charge storage units CS by a value obtained by multiplying the charge generated in the photoelectric conversion element PD in unit time by the integration period.

Figure 18A:
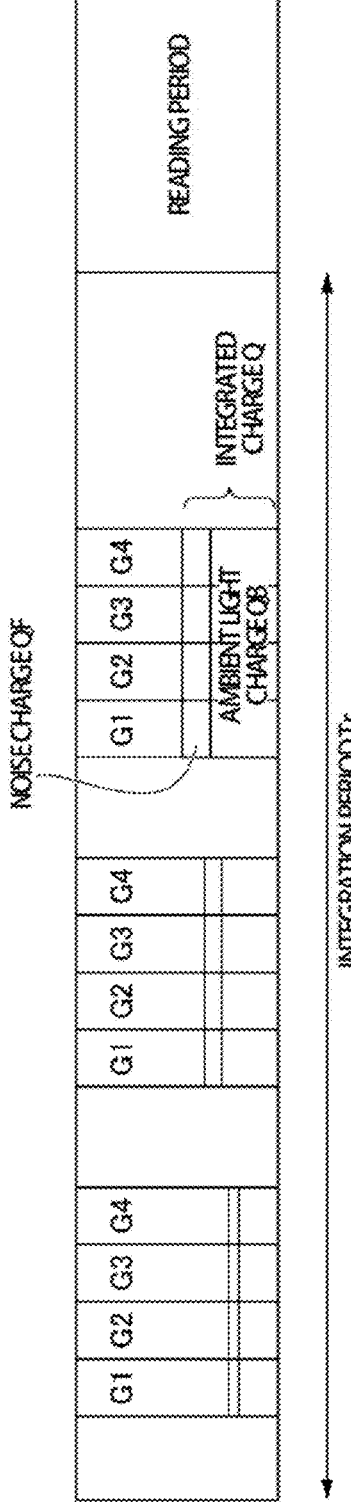
FIG. 18A is a diagram illustrating acquisition of a noise charge inflow ratio $\alpha$ in a noise charge acquisition mode.
Figure 18B:
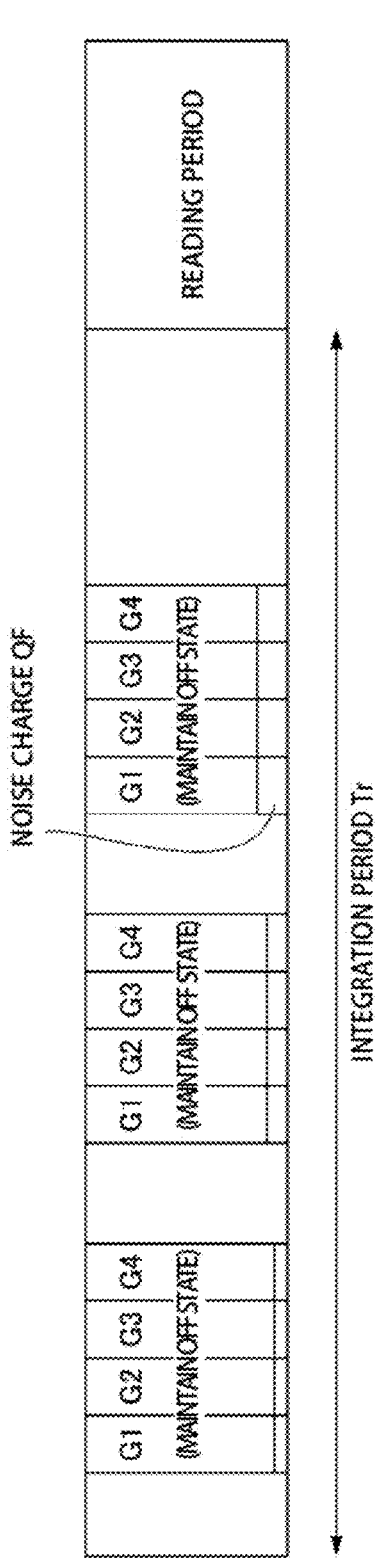
FIG. 18B is a diagram illustrating acquisition of a noise charge inflow ratio $\alpha$ in a noise charge acquisition mode.

FIGS. 18A and 18B are diagrams each illustrating acquisition of a noise charge inflow ratio α in the noise charge acquisition mode. In the noise charge acquisition mode, a first ratio acquisition frame and a second ratio acquisition frame are executed.

Specifically, for example, when the range imaging device 100 is activated, or when these frames are optionally executed, the measurement control unit 440 switches operation state from the ranging charge acquisition mode to the noise charge acquisition mode. Then, the measurement control unit 440 controls timing for the timing control unit 410 and controls calculation for the distance calculation unit 430.

FIG. 18A shows an operation of the first ratio acquisition frame in which reference integrated charges QR are acquired as integrated charges used for calculating a noise charge inflow ratio α, with only ambient light used as incident light without emission of the light pulses PO.

In the case shown in FIG. 18A, the transfer transistors G1, G2, G3, G4 are tuned on or off S times as a predetermined number of times of distribution by the integration drive signals TX1, TX2, TX3, TX4 having a pulse width of TS during the integration period of the frame cycle, so that charge can be distributed to the charge storage units CS1, CS2, CS3, CS4 from the photoelectric conversion element PD for integration of reference charges QR1, QR2, QR3, QR4 therein.

The noise charge estimation unit 420 acquires the reference integrated charges QR1, QR2, QR3, QR4 from the respective charge storage units CS1, CS2, CS3, CS4 for each pixel circuit 321 during the reading period of the first ratio acquisition frame under the control of the pixel drive circuit 322.

The acquired reference integrated charges QR1, QR2, QR3, QR4 include reference ambient light charges QBR1, QBR2 QBR3, QBR4 and reference noise charges QFR1, QFR2, QFR3, QFR4, respectively.

FIG. 18B shows an operation of the second ratio acquisition frame in which reference integrated charges QR are acquired as integrated charges used for calculating a noise charge inflow ratio α, with only ambient light used as incident light without emission of the light pulses PO.

In the case shown in FIG. 18B, the transfer transistors G1, G2, G3, G4 are kept turned off without supply of the integration drive signals TX1, TX2, TX3, TX4 during the integration period of the frame cycle, so that noise charge can flow into the charge storage units CS1, CS2, CS3, CS4 and can be integrated therein as reference noise charges QFR1, QFR2, QFR3, QFR4.

The noise charge estimation unit 420 acquires the reference noise charges QFR1, QFR2, QFR3, QFR4 from the respective charge storage units CS1, CS2, CS3, CS4 for each pixel circuit 321 during the reading period of the second ratio acquisition frame under the control of the pixel drive circuit 322. The reference noise charges QFR1, QFR2, QFR3, QFR4, which flow into the respective charge storage units CS1, CS2, CS3, CS4 for integration therein, are equivalent to each other.

The noise charge estimation unit 420 subtracts the reference noise charges QFR1, QFR2, QFR3, QFR4 from the respective reference integrated charges QR1, QR2, QR3, QR4 acquired in the first ratio acquisition frame to calculate reference ambient light charges QBR1, QBR2 QBR3, QBR4.

The noise charge estimation unit 420 extracts smallest charge from the reference ambient light charges QBR1, QBR2 QBR3, QBR4 as a smallest reference ambient light charge.

Then, the noise charge estimation unit 420 multiplies the smallest reference ambient light charge by a corresponding one of the correction factors R to acquire an adjustment reference ambient light charge.

The noise charge estimation unit 420 multiplies the pulse width (first on-state period of time TP1) of the integration drive signals TX by the distribution count (first distribution count, M1) to calculate a product as a total transfer period of time.

The noise charge estimation unit 420 divides the adjustment reference ambient light charge by the total transfer period to calculate a unit reference ambient light charge corresponding to the charge generated per unit time in the photoelectric conversion element PD due to ambient light.

Then, the noise charge estimation unit 420 divides the reference noise charges QFR1, QFR2, QFR3, QFR4 as a reference noise charge QFR by the integration period to calculate a unit time inflow charge that flows into the charge storage units CS per unit time.

Thus, the noise charge estimation unit 420 divides the unit time inflow charge by the unit reference ambient light charge to calculate a noise charge inflow ratio α.

Specifically, since the intensity of ambient light is constant, the charge generated in the photoelectric conversion element PD per unit time is correlated to the charge generated due to reflected light and flows into the charge storage units per unit time.

More specifically, in distance measurement, when the charge generated per unit time in the photoelectric conversion element PD due to ambient light is calculated, the noise charge estimation unit 420 can estimate the noise charge that flows into the charge storage units CS per unit time from this calculated charge and the noise charge inflow ratio α.

If the noise charge acquisition mode shown in FIG. 18 is terminated, the measurement control unit 440 switches mode from the noise charge acquisition mode to the ranging charge acquisition mode. Then, the measurement control unit 440 controls timing for the timing control unit 410 and controls calculation for the distance calculation unit 430.

Then, the noise charge estimation unit 420 reads the integrated charges Q1, Q2, Q3, Q4 from the respective charge storage units CS1, CS2, CS3, CS4 in the reading period of the frame cycle.

The noise charge estimation unit 420 extracts a smallest charge (charge component including no charge component due to the reflected light RL and generated due to only ambient light) from the integrated charges Q1, Q2, Q3, Q4.

This smallest charge QP includes the ambient light charge QB as controlled charge distributed from the photoelectric conversion element PD via the corresponding transfer transistor G, and the noise charge QF (adjustment noise charge QFP) as noise charge flowed in without passing through the transfer transistor G.

Accordingly, the smallest charge QP can be expressed as the following Formula (5).

$$QP=QB+QF \quad (5)$$

The adjustment noise charge QFP is expressed as the following Formula (6) using a second integration period T2, pulse width (second on-state period of time) TP2 of the integration drive signals TX (emission period To in the present embodiment), distribution count M2, ambient light charge QB, and the noise charge inflow ratio α in the frame cycle of the ranging charge acquisition mode.

$$QFP=(QB/(TP2\times M2))\times\alpha\times T2 \quad (6)$$

The noise charge estimation unit 420 calculates unknown values of an ambient light charge QB and adjustment noise charge QFP through a linear simultaneous equation of Formulas (5) and (6).

Then, the noise charge estimation unit 420 outputs the calculated adjustment noise charge QFP to the distance calculation unit 430.

The distance calculation unit 430 subtracts the adjustment noise charge QFP from each of the integrated charges Q1, Q2, Q3, Q4 to calculate corrected integrated charges CQ1 (=Q1−QF), CQ2(=Q2−QF), CQ3(=Q3−QF), CQ4(=Q4−QF).

The distance calculation unit 430 multiplies the corrected integrated charges CQ1, CQ2, CQ3, CQ4 by the respective correction factors β1, β2, β3, β4 to calculate integrated charges Q1B, Q2B, Q3B, Q4B.

Then, the distance calculation unit 430 calculates a delay time Td from Formulas (3) and (4) described above, and calculates the distance between the range imaging device 100 and the object S based on the delay time Td.

Figure 19:
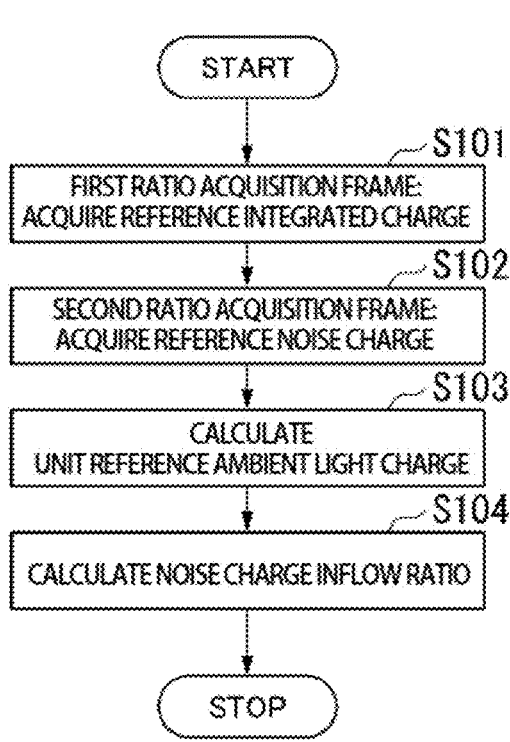
FIG. 19 is a flowchart illustrating processing of calculating a noise charge inflow ratio $\alpha$ in a noise charge acquisition mode according to an embodiment of the present invention.

FIG. 19 is a flowchart illustrating processing of calculating the noise charge inflow ratio α in the noise charge acquisition mode according to the present embodiment.

Step S101

As shown in FIG. 18A, the measurement control unit 440 causes the timing control unit 410 to execute the first ratio acquisition frame to acquire the reference integrated charges QR without emitting the light pulses PO.

Then, in the integration period T1, the noise charge estimation unit 420 distributes the charge generated in the photoelectric conversion element PD due to ambient light to the charge storage units CS1, CS2, CS3, CS4 for integration therein via the transfer transistors G1, G2, G3, G4.

The noise charge estimation unit 420 distributes the charge to the charge storage units CS1, CS2, CS3, CS4 via the respective transfer transistors G1, G2, G3, G4.

In the reading period of the second ratio acquisition frame, the noise charge estimation unit 420 acquires the reference integrated charges QR1, QR2, QR3, QR4 flowed in and integrated during the integration period T1.

Herein, the integration drive signals TX1, TX2, TX3, TX4 for the respective transfer transistors G1, G2, G3, G4 have the same pulse width TP1. The number of times distribution is performed is M1.

Step S102

As shown in FIG. 18B, after completion of the first ratio acquisition frame, the measurement control unit 440 causes the timing control unit 410 to execute the second ratio acquisition frame to acquire the reference noise charges QFR1, QFR2, QFR3, QFR4 without emitting the light pulses PO and without driving the transfer transistors G1, G2, G3, G4.

In the reading period of the second ratio acquisition frame, the noise charge estimation unit 420 acquires the reference noise charges QFR1, QFR2, QFR3, QFR4 that have flowed into the charge storage units CS1, CS2, CS3, CS4 for integration therein during the integration period T1.

Step S103

The noise charge estimation unit 420 subtracts the reference noise charges QFR1, QFR2, QFR3, QFR4 acquired in the second ratio acquisition frame from the respective reference integrated charges QR1, QR2, QR3, QR4 acquired in the first ratio acquisition frame.

Thus, the noise charge estimation unit 420 acquires the reference ambient light charges QBR1, QBR2 QBR3, QBR4 distributed in the integration period T1 from the photoelectric conversion element PD via the transfer transistors G1, G2, G3, G4 and integrated in the charge storage units CS1, CS2, CS3, CS4.

Step S104

The noise charge estimation unit 420 extracts a smallest charge from the reference ambient light charges QBR1, QBR2 QBR3, QBR4 as a smallest reference ambient light charge.

Then, the noise charge estimation unit 420 multiplies the smallest reference ambient light charge by the corresponding correction factor β to acquire an adjustment reference ambient light charge.

In this case, for example, if the smallest reference ambient light charge is the reference ambient light charge QBR1, which has been distributed to the charge storage unit CS1 via the transfer transistor G1, the noise charge estimation unit 420 multiplies the reference ambient light charge QBR1 by the correction factor β1 and uses the product as an adjustment reference ambient light charge.

The noise charge estimation unit 420 multiplies the pulse width TP1 of the integration drive signals TX by the distribution count M1 of the transfer transistors G to calculate TP1×M1 as a total transfer period.

Then, the noise charge estimation unit 420 divides the adjustment reference ambient light charge by the total transfer period TP1×M1 to calculate a unit reference ambient light charge. The noise charge estimation unit 420 multiplies the unit reference ambient light charge by the integration period T1, and divides the reference noise charges QF by the product to calculate a noise charge inflow ratio α.

Figure 20:
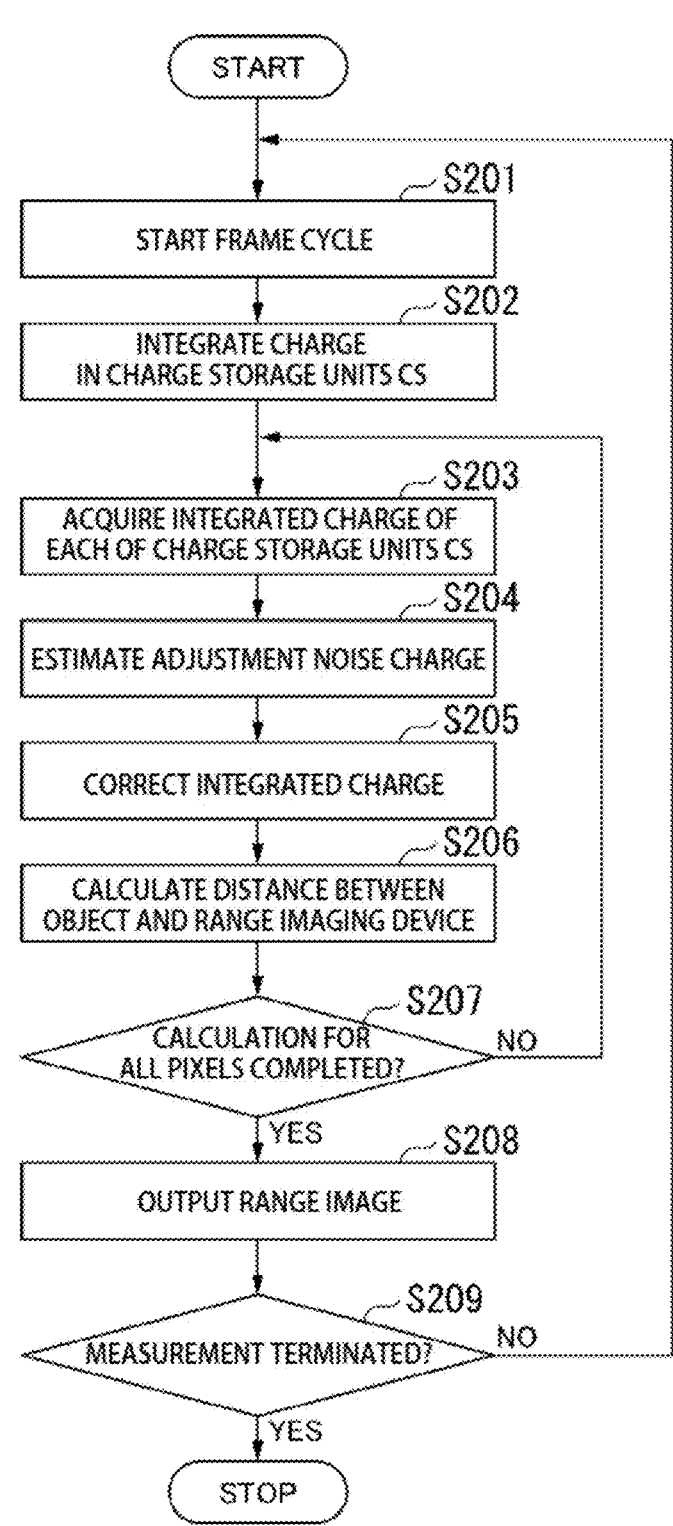
FIG. 20 is a flowchart illustrating range image acquisition processing in a ranging charge acquisition mode according to an embodiment of the present invention.

FIG. 20 is a flowchart illustrating range image acquisition processing in the ranging charge acquisition mode according to the present embodiment.

Step S201

As shown in FIG. 16, in the second integration period T2 of a frame cycle, the measurement control unit 440 causes the timing control unit 410 to allow emission of the light pulses PO (pulse width (mission period) To) at predetermined timing and execute a predetermined frame cycle to integrate the integrated charges Q1, Q2, Q3, Q4 in the respective charge storage units CS1, CS2, CS3, CS4.

Step S202

Then, in the second integration period T2 of the frame cycle, the pixel drive circuit 322, which is in the state of receiving the reflected light RL of the light pulses PO emitted at predetermined timing, allows the photoelectric conversion element PD to integrate the integrated charges Q1, Q2, Q3, Q4 in the respective charge storage units CS1, CS2, CS3, CS4 via the transfer transistors G1, G2, G3, G4.

Herein, the integration drive signals TX1, TX2, TX3, TX4 for the respective transfer transistors G1, G2, G3, G4 have the same pulse width TP2. The distribution count is M2.

Step S203

In the reading period of the frame cycle, the pixel drive circuit 322 sequentially outputs the integrated charges Q1, Q2, Q3, Q4 of the respective charge storage units CS1, CS2, CS3, CS4 to the range image processing unit 400 from each of the pixel circuits 321.

The noise charge estimation unit 420 extracts a smallest charge not including the charge of the reflected light RL but including only the charge of ambient light, from the integrated charges Q1, Q2, Q3, Q4.

Step S204

As shown in Formula (5), the extracted smallest charge QP includes the ambient light charge QB as controlled charge and noise charge QF that flows in without being controlled (i.e., adjustment noise charge QFP). The ambient light charge QB and the noise charge QF have unknown values.

Herein, the ambient light charges QB1, QB2, QB3, QB4 are equivalent to each other because the charge generated in the photoelectric conversion element PD due to ambient light is distributed using the integration drive signals TX1, TX2, TX3, TX4 having the same pulse width TP2.

Also, the noise charges QF1, QF2, QF3, QF4 are equivalent to each other because these are the charges that flow into the charge storage units CS1, CS2, CS3, CS4 in the same integration period T2 without being controlled by the pixel drive circuit 322.

The noise charge estimation unit 420 solves Formulas (5) and (6) with the smallest charge QP, the pulse width TP2, the integration time T2, the distribution count M2, and the noise charge inflow ratio α as being known values and with the ambient light charges QB and the adjustment noise charge QFP as being unknown values to calculate the adjustment noise charge QFP and the ambient light charges QB.

Step S205

The noise charge estimation unit 420 subtracts the adjustment noise charge QFP from each of the integrated charges Q1, Q2, Q3, Q4 to calculate respective corrected integrated charges CQ1, CQ2, CQ3, CQ4.

The noise charge estimation unit 420 multiplies the corrected integrated charges CQ1, CQ2, CQ3, CQ4 by the respective correction factors R31, 02, 03, 34 to calculate integrated charges Q1B, Q2B, Q3B, Q4B.

Step S206

Using the integrated charges Q1B, Q2B, Q3B, Q4B, the distance calculation unit 430 calculates a delay time Td from Formula (3) or (4) described above.

The distance calculation unit 430 calculates the round-trip distance between the range imaging device 100 and the object S by multiplying the calculated delay time Td by the speed of light (velocity).

Then, the distance calculation unit 430 calculates ½ of the round-trip distance calculated above (delay time Td×c (light velocity)/2) to calculate the distance to the object S from the range image sensor 32 (i.e., the range imaging device 100).

Step S207

The distance calculation unit 430 determines whether the distance calculation has been completed in all the pixel circuits 321 (i.e., pixels) of the range image sensor 32.

In this case, if the distance calculation in all the pixel circuits 321 has been completed, the distance calculation unit 430 allows processing to proceed to step S208.

However, if there remain pixel circuits 321 for which distance calculation has not been completed, the distance calculation unit 430 allows processing to return to step S203, the pixel circuits 321 has been completed, the distance calculation unit 430 allows processing to return to step S203.

Step S208

The distance calculation unit 430 uses the integrated charges Q1, Q2, Q3, Q4 supplied from all the pixel circuits 321 of the range image sensor 32 to generate a range image that is an image in which the distance between each of the pixels and the object S is expressed as a gradient.

Then, the distance calculation unit 430 outputs the generated range image to a predetermined external device or the like, or writes the generated range image in a storage, not shown, for storing range images.

Step S209

The measurement control unit 440 determines whether a measurement termination signal for terminating range imaging has been received.

In this case, if the measurement termination signal has been received, the measurement control unit 440 terminates range imaging (ranging processing).

However, if the measurement termination signal has not been received, the measurement control unit 440 allows control to return to step S201.

As described above, according to the present embodiment, the noise charge (i.e., adjustment noise charge QFP) is subtracted from each of the integrated charges Q read from the respective charge storage units CS before the integrated charges are each multiplied by a corresponding one of the correction factors β for correcting sensitivity, and therefore, when correcting variation in transfer efficiency of the transfer transistors G, variation in noise charge included in the integrated charges can be suppressed, by which distance calculation accuracy can be improved, and a range image having more accurate ranging information than in the conventional art can be captured.

Furthermore, in the noise charge acquisition mode of the present embodiment, a unit time inflow charge, i.e., the noise charge flowing into the charge storage units CS per unit time, is divided by a unit reference ambient light charge, i.e., the charge generated in the photoelectric conversion element PD due to incident light (reflected light in the present embodiment) per unit time, to calculate a noise charge inflow ratio α.

Therefore, in the present embodiment, in a noise charge acquisition mode of a different frame cycle, adjustment noise charge QFP (i.e., noise charge QF) can be easily calculated using the noise charge inflow ratio α through a simultaneous equation that uses the integration period, the pulse width TP2 of the integration drive signals TX, the distribution count M2 of the transfer transistors G, and the actually measured integrated charges Q of the noise charge acquisition mode.

The range imaging device using TOF techniques and having configurations of the first to fourth embodiments has been described so far; however, the present invention is not limited to be applied to this but can be applied to sensors such as RGB-TR (Red Green Blue-infrared) sensors with a structure in which a photodiode supplies charge to a single charge storage unit.

As long as charge generated in the photodiode due to incident light is configured to be integrated in the charge storage units, the present invention may also be applied to CCD (charge coupled device) image sensors, CMOS (complementary metal oxide semiconductor) image sensors, or the like.

A range imaging device and a range imaging method according to embodiments of the present invention capture a more accurate range image without changing the optical structure of the device, or without hindering size and profile reduction and improving in high definition and quantum efficiency.

Furthermore, a range imaging device and a range imaging method according to embodiments of the present invention improve accuracy in distance calculation and capture a more accurate range image by removing variation in noise charge by multiplying the charge read from each of the charge storage units by a corresponding one of sensitivity correction factors, when correcting the read charges that vary from each other due to variation in characteristics between the transfer transistors.

Time of flight (hereinafter referred to as TOF) type range imaging devices measure the distance to an object based on the time of flight of light, using the speed of light (e.g., see JP-2015-29054 A).

Such a TOF type range imaging device includes a light source unit that emits light, and an imaging unit including a pixel array in which multiple pixel circuits that detect light for measuring a distance are formed in a two-dimensional matrix (in an array). The pixel circuits each include a photoelectric conversion element (e.g., photodiode) as a component which generates electrical charge corresponding to the intensity of light.

With this configuration, the TOF type range imaging device can acquire information on the distance between itself and the object or can capture an image of the object in a measurement space (three-dimensional space).

Also, range imaging devices are required to have a miniaturized and lower-profile (thinner) housing (imaging device), for use in mobile terminals such as smartphones and tablets.

On the other hand, range imaging devices are required to have imaging units with an increased number of pixels in order to capture images with higher definition.

Therefore, the angle of incident light on the pixel circuits formed at end portions of the pixel array becomes larger compared to the angle of incident light on the pixel circuits formed in the vicinity of the center portion thereof.

As the angle of incident light on the pixel circuits increases, light is applied to a wider area including not only the photoelectric conversion elements of the pixel circuits but also the circuit components, e.g., charge storage units where charge is integrated, around the photoelectric conversion elements.

Thus, charge corresponding to light emitted due to photoelectric effect (termed noise charge hereinafter) is generated not only in the photoelectric conversion elements but also in the peripheral circuit components (including the charge storage units), and the generated charge flows into the charge storage units having a high potential.

Thus, the noise charge from the peripheral circuit components is added to the charge which is transferred from the photoelectric conversion element to the charge storage units for use in ranging, which resultantly reduces the accuracy of distances calculated based on the charge integrated in the charge storage units.

Accordingly, as a measure to suppress noise charge generation described above, pixel circuits are configured to prevent light from being incident on the peripheral circuit components other than the photoelectric conversion elements.

For example, a configuration used as a measure to suppress entry of light into peripheral circuit components other than the photoelectric conversion elements in the pixel circuits is that microlenses are formed above respective pixel circuits so that the microlenses can collect light and the collected light can be incident on the photoelectric conversion elements. Thus, incident light on the pixel circuits is collected by the microlenses, applied to only the photoelectric conversion elements, and prevented from being applied to other peripheral circuit components.

Another measure to suppress entry of light into peripheral circuit components other than the photoelectric conversion elements in the pixel circuits is taken in front side illuminated (FSI) CMOS image sensors. Specifically, these sensors use a configuration in which a metal-pattern light-shielding layer is provided to a layer directly above the pixel circuits so that the circuit components other than the photoelectric conversion elements are shielded from light.

However, for light collection using microlenses, the microlenses are required to become thinner as the range imaging devices are made thinner due to the need for a lower profile.

Therefore, microlenses cannot be imparted with a curvature sufficient for collecting incident light on the photoelectric conversion elements, making it difficult to perform light collection in which light is applied to only the photoelectric conversion elements.

As for the configuration of providing a light-shielding layer, in FSI image sensors, the metal pattern of a wiring layer for pixel circuits, which is located between photoelectric conversion elements and microlenses, can be used for forming a light-shielding metal pattern.

However, in back side illuminated (BSI) image sensors, light is configured to be incident not from the front surface of the semiconductor substrate on which pixel circuits are formed but from the rear surface of the semiconductor substrate.

Therefore, since no wiring layer is present on the rear surface of the semiconductor substrate due to having no circuits thereon in the configuration of the BSI image sensors, no light-shielding metal pattern can be formed using the metal pattern of the wiring layer, unlike in the FSI image sensors.

For the purpose of improving sensitivity to incident light, as in JP-2015-29054 A, BSI image sensors may use a configuration for increasing the optical path length in the semiconductor substrate by providing a structure of scattering/reflecting incident light to increase the quantum efficiency.

In the case of this structure, light collected by the microlenses is scattered in the semiconductor substrate and thus more light enters the peripheral light components, causing generation of noise charge in the peripheral circuit components other than the photoelectric conversion elements.

A range imaging device and a range imaging method according to embodiments of the present invention capture a more accurate range image without changing the optical structure of the device, or without hindering size and profile reduction, progress in high definition, or improving in quantum efficiency.

Also, range imaging devices are required to have a miniaturized and lower-profile (thinner) housing (imaging device), for use in mobile terminals such as smartphones and tablets.

Furthermore, range imaging devices are required to have imaging units with an increased number of pixels in order to capture images with higher definition.

Therefore, the angle of incident light on the pixel circuits formed at end portions of the pixel array becomes larger compared to the angle of incident light on the pixel circuits formed in the vicinity of the center portion thereof.

As the angle of incident light on the pixel circuits increases, light is applied to a wider area including not only the photoelectric conversion elements of the pixel circuits but also the circuit components, e.g., charge storage units where charge is integrated, around the photoelectric conversion elements.

Thus, charge corresponding to light emitted due to photoelectric effect (termed noise charge hereinafter) is generated not only in the photoelectric conversion elements but also in the peripheral circuit components (including the charge storage units), and the generated charge flows into the charge storage units having a high potential.

In addition, since the transfer transistors for distributing charge to the charge storage units from the photoelectric conversion elements are different from each other in characteristics, the characteristics of the transfer transistors are required to be corrected.

This correction is performed in the processing of multiplying the charge read from each charge storage unit by a sensitivity correction factor determined for the corresponding transfer transistor.

Noise charge is generated in the semiconductor substrate and flows into the charge storage units without passing through the transfer transistors, and therefore, the integrated charge is equivalent between the charge storage units.

However, when the charge read from each charge storage unit is multiplied by the sensitivity correction factor determined for the charge storage unit, the noise charge included in the read charge may also be subjected to correction.

In other words, since the noise charge is not affected by the characteristics variation of the transfer transistors, the noise charge, which is equivalent between the charge storage units, may be excessively corrected by the sensitivity correction factor.

Accordingly, in the charge read from the respective charge storage units, the noise charge may be varied between the charge storage units, and this variation may deteriorate the accuracy of distance calculation.

A range imaging device and a range imaging method according to embodiments of the present invention improve accuracy in distance calculation and capture a more accurate range image by removing variation in noise charge by multiplying the charge read from each of charge storage units by a corresponding one of sensitivity correction factors, when correcting each of the read charges that vary from each other due to variation in characteristics between the transfer transistors.

A range imaging device according to an embodiment of the present invention includes: a light source unit that emits light pulses to a measurement space; a light-receiving unit that includes at least one pixel circuit and a pixel drive circuit, the at least one pixel circuit including a photoelectric conversion element that generates charge according to light incident from the measurement space, and multiple charge storage units in which the charge is integrated in a frame cycle including one or more frames, the pixel drive circuit performing switching operation of transfer transistors to distribute the charge to each of the charge storage units for integration therein at a predetermined integration timing synchronizing with emission of the light pulses; and a distance calculation unit that calculates a distance between an object in the measurement space and the light-receiving unit based on a first charge of the charge integrated in each of the charge storage units, wherein the distance calculation unit calculates the distance by subtracting a second charge from each of the first charges, the second charge being noise charge generated other than in the photoelectric conversion element.

In the range imaging device according to an embodiment of the present invention, any of the frames may be a noise charge acquisition frame that acquires the second charge; in the noise charge acquisition frame after emission of the light pulses from the light source unit, in a state in which no charge is integrated in the charge storage units from the photoelectric conversion element in response to the pixel drive circuit turning off the transfer transistors, charge integrated in each of the charge storage units may be the second charge; and in frames following the noise charge acquisition frame, in response to the pixel drive circuit turning on or off the transfer transistors, the charge may be distributed to each of the charge storage units for integration therein as the first charge.

In the range imaging device according to an embodiment of the present invention, each of the frames may be divided into a first sub-frame and a second sub-frame; in the first sub-frame after emission of the light pulses from the light source unit, in a state in which no charge is integrated in the charge storage units from the photoelectric conversion element in response to the pixel drive circuit turning off the transfer transistors, charge integrated in each of the charge storage units may be the second charge; and in the second sub-frame, in response to the pixel drive circuit turning on or off the transfer transistors, the charge may be distributed to each of the charge storage units for integration therein as the first charge.

In the range imaging device according to an embodiment of the present invention, the frames may each be configured by an integration period in which the charge is distributed to each of the charge storage units for integration therein, and a reading period in which integrated charge is read from each of the charge storage units; and the integration period may be shortened to provide the first sub-frame and the second sub-frame.

A range imaging device according to an embodiment of the present invention may include: a light source unit that emits light pulses to a measurement space; a light-receiving unit that includes at least one pixel circuit and a pixel drive circuit, the at least one pixel circuit including a photoelectric conversion element that generates charge according to light incident from the measurement space, and multiple charge storage units in which the charge is integrated in a frame cycle including one or more frames, the pixel drive circuit performing switching operation of transfer transistors to distribute the charge to each of the charge storage units for integration therein at a predetermined integration timing synchronizing with emission of the light pulses; and a distance calculation unit that calculates a distance between an object in the measurement space and the light-receiving unit based on charge determined by first charge of the charge integrated in each of the charge storage units, wherein the distance calculation unit may calculate the distance by subtracting a second charge from each of the first charges, the second charge being noise charge as an integrated charge other than the charge distributed and integrated by the switching operation of the transfer transistors.

In the range imaging device according to an embodiment of the present invention, the distance calculation unit may calculate a fifth charge, in the case where a second distribution count of the distribution in each of the frames following the noise charge acquisition frame is changed from a first distribution count of the distribution in each of the first noise charge acquisition frame and the second noise charge acquisition frame, by dividing the second distribution count by the first distribution count, and multiplying the fourth charge by the division result as an adjustment factor; and may add the fifth charge to the third charge to correct the second charge for use in the distance calculation.

In the range imaging device according to an embodiment of the present invention, the light pulses emitted from the light source unit may be pulses in the near infrared wavelength band with a predetermined width.

In the range imaging device according to an embodiment of the present invention, the at least one pixel circuit may have a back side illumination (BSI) structure.

In the range imaging device according to an embodiment of the present invention, the at least one pixel circuit may have three or more charge storage units.

In the range imaging device according to an embodiment of the present invention, the at least one pixel circuit may be provided with one or more charge discharge transistors that discharge charge from the photoelectric conversion element other than in a period of distributing charge to each of the charge storage units for integration therein.

A range imaging method is a method of controlling a range imaging device provided with at least one pixel circuit, a light source unit, a pixel drive circuit, and a distance calculation unit, the at least one pixel circuit including a photoelectric conversion element and multiple charge storage units and may include emitting light pulses into a measurement space, as performed by a light source unit; integrating charge in the charge storage units in a frame cycle, the charge being generated in the photoelectric conversion element due to light incident from the measurement space, as performed by the at least one pixel circuit; distributing the charge to each of the charge storage units for integration therein by performing switching operation of the transfer transistors at predetermined timing synchronizing with emission of the light pulses, as performed by the pixel drive circuit; and calculating a distance between an object in the measurement space and the light-receiving unit, based on a charge determined by a first charge that is the charge integrated in each of the charge storage units, as performed by the distance calculation unit, wherein the distance calculation unit may calculate the distance by subtracting a second charge from each of the first charges, the second charge being a noise charge as an integrated charge other than the charge distributed to the charge storage units for integration therein by the switching operation of the transfer transistors.

The range imaging device according to an embodiment of the present invention may further include a noise charge estimation unit that estimates the second charge from ambient light charge using a noise charge inflow ratio between the ambient light charge and noise charge, the ambient light charge being generated due to ambient light in the measurement space and distributed from the photoelectric conversion element to the charge storage units for integration therein via the transfer transistors, the noise charge being generated due to the ambient light and flowing into the charge storage units for integration therein without passing through the transfer transistors.

In the range imaging device according to an embodiment of the present invention, the pixel drive circuit may execute a first ratio acquisition frame and a second ratio acquisition frame before executing the frame cycle for measuring the distance, the first ratio acquisition frame being a frame in which reference integrated charge is acquired by distributing the charge from the photoelectric conversion element to the charge storage units for integration therein through switching operation of the transfer transistors without emission of the light pulses, the second ratio acquisition frame being a frame in which a reference noise charge that flows into the charge storage units for integration therein is acquired without switching operation of the transfer transistors and emission of the light pulses; and the noise charge estimation unit may calculate the noise charge inflow ratio based on a reference ambient light charge and the reference noise charge, the reference ambient light charge being obtained by subtracting the reference noise charge from the reference integrated charge.

In the range imaging device according to an embodiment of the present invention, the noise charge estimation unit may calculate a unit reference ambient light charge by dividing the reference ambient light charge by a total transfer period of time obtained by multiplying a first distribution count that is the number of times of distribution in the first ratio acquisition frame by a first on-state period of time during which the transfer transistors are in an on state, and may calculate the noise charge inflow ratio by dividing the reference noise charge by a product of the unit reference ambient light charge and a first integration period of the first ratio acquisition frame during which charge is integrated.

In the range imaging device according to an embodiment of the present invention, the noise charge estimation unit may multiply the reference ambient light charge by an adjustment factor for correcting variation which is due to on-state characteristics of corresponding transfer transistors and may use the adjusted reference ambient light charge for calculation of the noise charge inflow ratio.

In the range imaging device according to an embodiment of the present invention, the noise charge estimation unit may solve a binary linear equation composed of a first linear equation and a second linear equation to calculate unknown values of the second charge and the ambient light charge, the first linear equation being an equation for calculating the second charge by subtracting the ambient light charge from a smallest charge of the first charges, the second linear equation being an equation for calculating the second charge for the ambient light charge by dividing a product of a second integration period in the frame cycle and the noise charge inflow ratio, by a product of a second on-state period of time of the transfer transistors and a second distribution count in the frame cycle.

In the range imaging device according to an embodiment of the present invention, the second charge may be calculated using a lookup table including variables as inputs and the second charges as outputs, the variables each being a product of the smallest charge of the first charges, the noise charge inflow ratio, the second integration period in the frame cycle, the second on-state period of time of the transfer transistors in the frame cycle, and the second distribution count of the transfer transistors in the frame cycle.

In the range imaging device according to an embodiment of the present invention, the noise charge estimation unit may multiply the smallest charge of the first charges by an adjustment factor for correcting variation which is due to variation in on-state characteristics of corresponding transfer transistors and may use the adjusted smallest charge for calculation of the second charge.

In the range imaging device according to an embodiment of the present invention, the distance calculation unit may multiply the corrected charge by an adjustment factor for correcting variation due to variation in on-state characteristics of corresponding transfer transistors, and may use the product as an adjusted corrected charge for calculation of the distance.

A range imaging method is a method of controlling a range imaging device provided with at least one pixel circuit, a pixel drive circuit, a distance calculation unit, and a noise charge estimation unit, the at least one pixel circuit including a photoelectric conversion element, multiple charge storage units, and multiple transfer transistors and includes distributing charge generated in the photoelectric conversion element due to incident light from a measurement space to each of N (N≥3) charge storage units for integration therein in a predetermined integration cycle synchronizing with emission of light pulses, through switching operation of the transfer transistors that transfer the charge in a frame cycle from the photoelectric conversion element to the charge storage units, as performed by the pixel drive circuit; estimating second charge from an ambient light charge using a noise charge inflow ratio that is a ratio between the ambient light charge and a noise charge, the ambient light charge being generated due to ambient light in the measurement space and distributed to the charge storage units for integration therein via the transfer transistors, the noise charge being generated due to the ambient light and flowing into the charge storage units for integration therein without passing through the transfer transistors, as performed by the noise charge estimation unit; and calculating a distance to an object using a corrected charge obtained by subtracting the second charge from each of first charges integrated in the charge storage units, as performed by the distance calculation section.

As described above, a range imaging device and a range imaging method according to embodiments of the present invention capture a more accurate range image without changing the optical structure of the device, or without hindering size and profile reduction, progress in high definition, and improvement in quantum efficiency.

Furthermore, a range imaging device and a range imaging method according to embodiments of the present invention improve accuracy in distance calculation and capture a more accurate range image by removing variation in noise charge by multiplying the charge read from each of the charge storage units by a corresponding one of sensitivity correction factors, when correcting the read charges that vary from each other due to variation in characteristics between the transfer transistors.

Obviously, numerous modifications and variations of the present invention are possible in light of the above teachings. It is therefore to be understood that within the scope of the appended claims, the invention may be practiced otherwise than as specifically described herein.

42

The invention claimed is:

1. A range imaging device, comprising:
a light source configured to emit light pulses to a measurement space;
a light-receiving unit comprising a pixel drive circuit and at least one pixel circuit including a photoelectric conversion element and a plurality of charge storage units; and
circuity that calculates a distance between an object in the measurement space and the light-receiving unit based on a charge determined by a first charge of a charge integrated in each of the charge storage units, wherein
the photoelectric conversion element of the light-receiving unit generates the charge according to light incident from the measurement space,
the plurality of charge storage units of the light-receiving unit integrates the charge in a frame cycle comprising one or more frames,
the pixel drive circuit in the light-receiving unit is configured to perform switching operation of transfer transistors to distribute the charge to each of the charge storage units for integration therein at a predetermined integration timing synchronizing with emission of the light pulses,
the circuity calculates the distance by subtracting a second charge from each of the first charges such that the second charge is noise charge as an integrated charge other than the charge distributed and integrated by the switching operation of the transfer transistors,
any of the frames is a noise charge acquisition frame that acquires the second charge,
in the noise charge acquisition frame after emission of the light pulses from the light source, in a state in which no charge is integrated in the charge storage units from the photoelectric conversion element in response to the pixel drive circuit turning off the transfer transistors, the charge integrated in each of the charge storage units is the second charge, and
in frames following the noise charge acquisition frame, in response to the pixel drive circuit turning on or off the transfer transistors, the charge is distributed to each of the charge storage units for integration therein as the first charge.

2. The range imaging device according to claim 1, wherein
each of the frames is divided into a first sub-frame and a second sub-frame;
in the first sub-frame after emission of the light pulses from the light source, in a state in which no charge is integrated in the charge storage units from the photoelectric conversion element in response to the pixel drive circuit turning off the transfer transistors, the charge integrated in each of the charge storage units is the second charge; and
in the second sub-frame, in response to the pixel drive circuit turning on or off the transfer transistors, the charge is distributed to each of the charge storage units for integration therein as the first charge.

3. The range imaging device according to claim 2, wherein
the frames are each configured by an integration period in which the charge is distributed to each of the charge storage units for integration therein, and a reading period in which integrated charge is read from each of the charge storage units; and
the integration period is shortened to provide the first sub-frame and the second sub-frame.

4. The range imaging device according to claim 1, wherein in a state in which no charge is integrated in the charge storage units from the photoelectric conversion element in response to the pixel drive circuit turning off the transfer transistors with no light pulses emitted from the light source unit, a frame in which charge is integrated in each of the charge storage units as third charge is a first noise charge acquisition frame;

in a state in which no charge is integrated in the charge storage units from the photoelectric conversion element in response to the pixel drive circuit turning off the transfer transistors after emission of the light pulses from the light source unit, a frame in which charge is integrated in each of the charge storage units as the second charge is a second noise charge acquisition frame; and the circuity subtracts the third charge from the second charge to calculate a fourth charge generated in areas other than in the photoelectric conversion element due to the light pulses.

5. The range imaging device according to claim 4, wherein the circuity calculates a fifth charge, in the case where a second distribution count of the distribution in each of the frames following the noise charge acquisition frame is changed from a first distribution count of the distribution in each of the first noise charge acquisition frame and the second noise charge acquisition frame, by dividing the second distribution count by the first distribution count, and multiplying the fourth charge by the division result as an adjustment factor; and adds the fifth charge to the third charge to correct the second charge for use in the circuity.

6. The range imaging device according to claim 1, wherein the light pulses emitted from the light source are pulses in a near infrared wavelength band with a predetermined width.

7. The range imaging device according to claim 1, wherein the at least one pixel circuit has a back side illumination structure.

8. The range imaging device according to claim 1, wherein the at least one pixel circuit has three or more charge storage units.

9. The range imaging device according to claim 1, wherein the at least one pixel circuit is provided with one or more charge discharge transistors that discharge charge from the photoelectric conversion element other than in a period of distributing charge to each of the charge storage units for integration therein.

10. The range imaging device according to claim 1, wherein the circuitry estimates the second charge from ambient light charge using a noise charge inflow ratio between the ambient light charge and noise charge such that the ambient light charge is generated due to ambient light in the measurement space and distributed from the photoelectric conversion element to the charge storage units for integration therein via the transfer transistors and that the noise charge is generated due to the ambient light and flowing into the charge storage units for integration therein without passing through the transfer transistors.

11. The range imaging device according to claim 10, wherein the pixel drive circuit is configured to execute a first ratio acquisition frame and a second ratio acquisition frame before executing the frame cycle for measuring the distance such that the first ratio acquisition frame is a frame in which reference integrated charge is acquired by distributing the charge from the photoelectric conversion element to the charge storage units for integration therein through switching operation of the transfer transistors without emission of the light pulses and that the second ratio acquisition frame is a frame in which a reference noise charge that flows into the charge storage units for integration therein is acquired without switching operation of the transfer transistors and emission of the light pulses, and the circuitry calculates the noise charge inflow ratio based on a reference ambient light charge and the reference noise charge such that the reference ambient light charge is obtained by subtracting the reference noise charge from the reference integrated charge.

12. The range imaging device according to claim 11, wherein the circuitry calculates a unit reference ambient light charge by dividing the reference ambient light charge by a total transfer period of time obtained by multiplying a first distribution count that is a number of times of distribution in the first ratio acquisition frame by a first on-state period of time during which the transfer transistors are in an on state, and calculates the noise charge inflow ratio by dividing the reference noise charge by a product of the unit reference ambient light charge and a first integration period of the first ratio acquisition frame during which charge is integrated.

13. The range imaging device according to claim 11, wherein the circuitry multiplies the reference ambient light charge by an adjustment factor for correcting variation which is due to on-state characteristics of corresponding transfer transistors and uses the adjusted reference ambient light charge for calculation of the noise charge inflow ratio.

14. The range imaging device according to claim 10, wherein the circuitry solves a binary linear equation composed of a first linear equation and a second linear equation to calculate unknown values of the second charge and the ambient light charge such that the first linear equation is an equation for calculating the second charge by subtracting the ambient light charge from a smallest charge of the first charges and that the second linear equation is an equation for calculating the second charge for the ambient light charge by dividing a product of a second integration period in the frame cycle and the noise charge inflow ratio, by a product of a second on-state period of time of the transfer transistors and a second distribution count in the frame cycle.

15. The range imaging device according to claim 14, wherein the circuitry multiplies the smallest charge of the first charges by an adjustment factor for correcting variation which is due to variation in on-state characteristics of corresponding transfer transistors and uses the adjusted smallest charge for calculation of the second charge.

16. The range imaging device according to claim 10, wherein the circuitry calculates the second charge using a lookup table including variables as inputs and the second charges as outputs such that each of the variables is a product of the smallest charge of the first charges, the noise charge inflow ratio, a second integration period in the frame cycle, a second on-state period of time of the transfer transistors in the frame cycle, and a second distribution count of the transfer transistors in the frame cycle.

17. The range imaging device according to claim 10, wherein the circuity multiplies each of the second charges by an adjustment factor for correcting variation due to variation in on-state characteristics of corresponding transfer transistors and uses the product of the multiplication as an adjusted corrected charge for calculation of the distance.

18. A range imaging method, comprising:

emitting light pulses into a measurement space by a light source of a range imaging device;

integrating, in a plurality of charge storage units of at least one pixel circuit in the range imaging device in a frame cycle, a charge generated in a photoelectric conversion element of the at least one pixel circuit in the range imaging device due to light incident from the measurement space by the at least one pixel circuit of the range imaging device;

distributing the charge to each of the charge storage units for integration therein by performing switching operation of transfer transistors at predetermined timing synchronizing with emission of the light pulses by a pixel drive circuit of the range imaging device; and calculating, based on a charge determined by a first charge that is a charge integrated in each of the charge storage units, a distance between an object in the measurement space and a light-receiving unit by circuity of the range imaging device, wherein the calculating calculates the distance by subtracting a second charge from each of the first charges such that the second charge is a noise charge as an integrated charge other than the charge distributed to the charge storage units for integration therein by the switching operation of the transfer transistors, any of the frames is a noise charge acquisition frame that acquires the second charge in the noise charge acquisition frame after emission of the light pulses from the light source, in a state in which no charge is integrated in the charge storage units from the photoelectric conversion element in response to the pixel drive circuit turning off the transfer transistors, the charge integrated in each of the charge storage units is the second charge, and in frames following the noise charge acquisition frame, in response to the pixel drive circuit turning on or off the transfer transistors, the charge is distributed to each of the charge storage units for integration therein as the first charge.

19. A range imaging method, comprising:

distributing, through switching operation of a plurality of transfer transistors of at least one pixel circuit in a range imaging device that transfer charge in a frame cycle from a photoelectric conversion element of the at least one pixel circuit to a plurality of charge storage units of the at least one pixel circuit, charge generated in the photoelectric conversion element due to incident light from a measurement space to each of N charge storage units for integration therein in a predetermined integration cycle synchronizing with emission of light pulses, where N≥3, by a pixel drive circuit of the range imaging device;

estimating, by circuitry of the range imaging device, second charge from an ambient light charge using a noise charge inflow ratio between the ambient light charge and a noise charge such that the ambient light charge is generated due to ambient light in the measurement space and distributed to the charge storage units for integration therein via the transfer transistors and that the noise charge is generated due to the ambient light and flowing into the charge storage units for integration therein without passing through the transfer transistors; and calculating, by the circuitry, a distance to an object using a corrected charge obtained by subtracting the second charge from each of first charges integrated in the charge storage units.

\* \* \* \* \*